(12) United States Patent
Harada

(10) Patent No.: US 7,048,839 B2
(45) Date of Patent: May 23, 2006

(54) SYSTEM AND METHOD FOR GENERATING HIGH PRESSURE HYDROGEN

(75) Inventor: Hiroyuki Harada, Tokyo (JP)

(73) Assignee: Mitsubishi Corporation, Tokyo (JP)

( * ) Notice: Subject to any disclaimer, the term of this patent is extended or adjusted under 35 U.S.C. 154(b) by 110 days.

(21) Appl. No.: 10/352,968

(22) Filed: Jan. 29, 2003

(65) Prior Publication Data

US 2003/0141200 A1     Jul. 31, 2003

(30) Foreign Application Priority Data

| Jan. 29, 2002 | (JP) | ............................ 2002-019713 |
| Mar. 19, 2002 | (JP) | ............................ 2002-077314 |
| May 28, 2002 | (JP) | ............................ 2002-153961 |
| Jun. 19, 2002 | (JP) | ............................ 2002-174815 |

(51) Int. Cl.
   *C25B 1/10* (2006.01)
   *C25B 9/00* (2006.01)
   *G01L 13/02* (2006.01)

(52) U.S. Cl. .................. 204/266; 73/716; 204/256
(58) Field of Classification Search ................ 204/256
   See application file for complete search history.

(56) References Cited

U.S. PATENT DOCUMENTS

| 5,284,571 | A | * | 2/1994 | Verbrugge ................... 205/118 |
| 5,399,251 | A | * | 3/1995 | Nakamats .................... 204/262 |
| 5,457,999 | A | * | 10/1995 | Feldman ....................... 73/704 |
| 5,690,797 | A | | 11/1997 | Harada et al. |
| 6,539,807 | B1 | * | 4/2003 | Wohlrab et al. .............. 73/723 |

FOREIGN PATENT DOCUMENTS

| DE | 4029634 A1 | * | 3/1992 |
| EP | 0 806 498 A1 | | 11/1997 |
| JP | 57-096232 A | * | 6/1982 |
| JP | 59-202027 A | * | 11/1984 |
| JP | 01-247591 A | * | 10/1989 |
| JP | 05-212381 A | * | 8/1993 |
| JP | 08-239789 A | * | 9/1996 |
| JP | 9-157878 | | 6/1997 |
| JP | 9-291386 | | 11/1997 |
| JP | 9-296288 | | 11/1997 |
| JP | 2000-054175 A | * | 2/2000 |
| JP | 2001-130901 | | 5/2001 |
| JP | 3220607 | | 8/2001 |

OTHER PUBLICATIONS

Machine Translation of Asari et al (JP 09-291386).*

* cited by examiner

*Primary Examiner*—Harry D. Wilkins, III
(74) *Attorney, Agent, or Firm*—McDermott Will & Emery LLP

(57) ABSTRACT

The invention provides a system and a method for generating high pressure hydrogen that is able to efficiently and safely generate hydrogen by only the electrolysis of water even when using electric power generated by a frequently varying natural energy, such as sunlight, without using any compressors. The system comprises an electrolysis cell using polyelectrolyte membranes, particularly a double-polarity multi-layered type electrolysis cell having a specified structure disposed in a vessel for storing generated hydrogen, preferably for storing cooled hydrogen under a high pressure hydrogen atmosphere. High pressure hydrogen is generated by electrolysis of pure water using the electrolysis cell by suppressing the pressure applied to the cell to a pressure below the pressure resistance of the cell using a differential pressure sensor and pressure controller.

38 Claims, 19 Drawing Sheets

SYSTEM AND METHOD FOR GENERATING HIGH PRESSURE HYDROGEN

BACKGROUND OF THE INVENTION

1. Field of the Invention

The invention relates to a system and method for directly generating high pressure hydrogen (compressed hydrogen) required for the utilization of hydrogen energy without using any mechanical pressurizing device, such as a compressor, whereby pure water, such as deionized water, distilled water and purified water after filtration are electrolyzed using a polyelectrolyte membrane (referred to as PEM hereinafter). The invention belongs to technology related to clean hydrogen energy.

2. Description of the Related Art

Carbon dioxide released by using fossil fuels, such as coal and petroleum, in recent years are thought to be major causes of global greenhouse effects. In addition, acid rain caused by nitrogen oxides and sulfur oxides discharged by the combustion of the fossil fuels serves as a major cause of the loss of human health and destruction of forests. Furthermore, there exist fundamental problems that the estimated amount of fossil fuel deposits is limited, and they may be depleted sooner or later.

To suppress these problems from occurring, the development of novel technologies is urgently desired, whereby the consumption of the fossil fuels is depressed or brought to an end, and clean natural energies that are able to be regenerated can be substituted for the fossil fuels are utilized.

The most abundant natural energy, as the substitute of fossil energy, is solar energy. The energy that the earth receives in one hour from the sun corresponds to or exceeds the energy consumed by humankind for one year. It is not a dream to cover the total energy demand of humankind by the solar energy alone, and many technologies for utilizing solar energy, such as solar generators have been proposed.

In the representative well known in the art methods for utilizing natural energies, such as solar generators, aerogenerators and hydroelectric generators, natural energy is taken out and utilized as electric power.

It is difficult to store and transport electric power itself. Electric power is usually stored by charging a battery. However, batteries are heavy, and the charge is consumed by self-discharge during storage while it is not used.

The most crucial problem for the future energy is to be free from the problems as described above, or the energy should be easily stored and transported while being able to be commonly used where and when necessary. Hydrogen is a candidate for generating energy that satisfies the conditions as described above.

Hydrogen can be readily stored, is able to regenerate its energy as electric power, is convenient and efficient as an energy source. Accordingly, it is contemplated to efficiently convert electric power obtained by natural energy into clean hydrogen energy by electrolysis of water, and to use a hydrogen energy source as a substitute of conventional energy sources, such as petroleum. It is anticipated that a hydrogen economy society using hydrogen as the energy source would be realized in the 21st century.

To realize the hydrogen economy society, the development of fuel cells using hydrogen as a fuel (Polyelectrolyte Fuel Cell, abbreviated as PEFC hereinafter) have been actively developed as means for efficiently utilizing hydrogen as the energy source. In addition, uses of hydrogen for automobile and home generators have been also considered. The hydrogen economy society with no anxiety of the greenhouse effect by carbon dioxide would be realized when the methods as described above are spread to enable hydrogen generated by natural energy to be widely utilized.

Such a society as described above is based on an assumption that crucial problems for efficiently generating hydrogen are solved using natural energies, particularly solar energy.

The most important problem for utilizing hydrogen as the energy source is how hydrogen gas could be safely transported and stored in a compact vessel.

For solving the problems as described above, it has been attempted to convert hydrogen gas into liquid hydrogen or to allow hydrogen to be occluded in an occlusive alloy. However, these methods involve unsolvable problems of spontaneous evaporation and insufficient occlusion volume. Since lightweight and highly pressure resistant gas cylinders have been developed in recent years, safety of high pressure hydrogen is reevaluated. Consequently, the hydrogen is often stored and transported by filling in a gas cylinder as compressed hydrogen with a pressure of as high as 350 atm or more. Such a method is widely noticed as a technology compatible for the hydrogen economic society.

When hydrogen is used for fuel cell vehicles using the fuel cells as described above, compressed hydrogen at a pressure of as high as 350 atom should be used. Otherwise, the volume of the hydrogen gas cylinder is large, and the space for the passenger cabin is reduced. When the volume of the hydrogen gas cylinder is small, on the other hand, the cruising distance is so shortened that it is impractical. Accordingly, it is a key point for shifting the current society to the hydrogen economy society to convert hydrogen, utilized as the energy source, into highly compressed hydrogen with a pressure of as high as 350 atm or more.

While hydrogen has been generated by electrolysis of an aqueous alkaline solution prepared by dissolving an alkaline electrolyte such as potassium hydroxide (KOH) in water for a long period of time, electrolysis using a polyelectrolyte membrane (abbreviated as PEM electrolysis hereinafter) by which pure water is directly electrolyzed into hydrogen and oxygen has been noticed in recent years as a result of developments of the polyelectrolyte fuel cells (PEFC). In PEFC water is electrolyzed by a reversed reaction of PEFC using the PEM.

As widely known in the art, since an alkali, such as potassium hydroxide, forms accumulated substances on electrodes by a reaction of the alkali with the impurities, such as carbon dioxide dissolved in water in electrolysis of the aqueous alkaline solution, aqueous electrolysis cells should be periodically cleaned to remove the accumulated substances. A purification device for removing alkali mists generated together with hydrogen is also required.

Since the hydrogen and oxygen generated are separated from each other with a porous partition membrane, such as a gas-permeable asbestos, the mixing ratio between them increases with a decrease in the amount of the generated gas, and the proportion of hydrogen or oxygen permeating through the porous membrane is relatively increased. Consequently, the mixed gas becomes a detonating gas that involves a danger of explosion making it difficult to arbitrarily stop and start gas generation. It is not easy to generate hydrogen by electrolysis of the aqueous alkaline solution using electric power generated by sunlight or aerodynamic power that frequently varies. Furthermore, since the pressure of hydrogen generated by electrolysis of the aqueous alkaline solution is low, use of a gas compressor is required in order to prepare a highly compressed hydrogen.

In contrast, pure water is directly electrolyzed to obtain highly pure hydrogen while hydrogen and oxygen are separated with PEM that permeates only protons in the PEM electrolysis method. Therefore, hydrogen and oxygen are not mixed with each other when electrolysis is suddenly stopped as in electrolysis of the aqueous alkaline, and start and stop of electrolysis may be arbitrarily repeated. Consequently, the PEM electrolysis method is excellent for converting the frequently varying electric power generated by natural energy into hydrogen.

The method for generating high pressure hydrogen by PEM electrolysis is inherently able to generate high pressure hydrogen and oxygen because of conversion of liquid to gas. Namely, a small volume is converted to a large volume with no mechanical pressure increasing device, such as a compressor used in principle. Eventually, hydrogen with a pressure of as high as 1000 atm or more may be obtained by only electrolysis. Since no mechanically movable parts are involved as compared with devices that mechanically increase pressure, periodic maintenance work with frequent inspection and replacement of expendables is not needed. Therefore, maintenance-free and unattended automatic operation for a long period of time is possible enabling the practical conversion of natural energy into hydrogen. Furthermore, since the PEM electrolysis method has a higher compression efficiency as compared with the method using mechanical pressure-increasing devices, such as a compressor, it is an advantage of the PEM electrolysis method that less compression power is required, and much expectation is concentrated on the generation of high pressure hydrogen by PEM electrolysis for energy conversion.

The system for generating hydrogen by PEM electrolysis comprises electrolysis cells prepared by laminating a plurality of unit cells with a structure in which the PEM, having catalytic electrodes such as platinum formed on both surfaces thereof, is sandwiched with the porous electrode through which pure water and gases are permeable. Since each cell is laminated in the electrolysis cell having the structure as described above, the electrode partitioning of each unit cell is a double-polarity electrode because the electrode serves as a cathode as well as an anode. The PEM electrolysis cell comprising laminated unit cells may be called a double-polarity multi-layered type electrolysis cell. Much expectation is concentrated on the emergence of a system for generating high pressure hydrogen by double-polarity multi-layered type electrolysis cells using PEM.

However, it is a current problem of electrolysis by electrolysis cell using PEM that the pressure resistance of the seal member and PEM of the electrolysis cell is as low as about 4 atm. Hydrogen and oxygen gases with a pressure of only several to several tens of atm at most may be generated in the electrolyte cell as described above, and hydrogen with a pressure of as high as 350 atm or more required for energy conversion cannot be generated. Therefore, hydrogen is required to be compressed using a gas compressor for efficient storage and transportation.

For obtaining high pressure hydrogen without using a gas compressor, liquid hydrogen is evaporated to convert it into the high pressure hydrogen, and the hydrogen is charged into a gas cylinder. However, it is a disadvantageous method, because the liquefaction of hydrogen needs a large amount of energy and liquid hydrogen diminishes under transportation and storage by evaporation. Moreover, the liquefier needs regular or frequent maintenance, and is hard to produce liquid hydrogen at a remote area under automatic operation with a shortage of hands.

With respect to energy loss, the energy conversion efficiency is decreased in the production of liquid hydrogen as compared to the use of compressed hydrogen since much energy is required in the former case. While about three hundred million cubic meters of hydrogen is sold annually in this country, several tenfolds of hydrogen is estimated to be consumed when only ten percent of domestic automobiles use hydrogen as the fuel. An amount of energy exceeding the amount of hydrogen energy currently available in the market may be consumed as the energy required for liquefying such a vast amount of hydrogen.

Although enough liquefying machines for liquefying such a vast amount of hydrogen should be constructed, the additionally constructed liquefying machines only consume energy without creating additional energy.

Therefore, use of liquefied hydrogen as an energy source is disadvantageous with respect to the energy conversion efficiency, and facilities that do not create additional energy are forced to be constructed to realize the use of liquefied hydrogen.

Accordingly, use of liquefied hydrogen as a high pressure hydrogen source, or as an energy source, is restrictive, and it is hardly conjectured that liquid hydrogen is the major energy source in the hydrogen economy society in the future.

The gas compressor involves, on the other hand, the problems of wear of parts as described previously. Moreover, mechanical pressure increasing devices such as the gas compressor for generating the high pressure hydrogen with a pressure as high as 350 atm or more is a theme of development. Devices with satisfactory functions are not available today. For example commercialized reciprocative compressors cannot make gas over 200 atm and diaphragm compressors need to exchange diaphragms every 1000 hours and its production capacity is 30 $N/m^3$ at most. There are no gas compressors with a capacity of 300 $N/m^3$ and contamination of hydrogen by the gas compressor itself is another problem that cannot be ignored.

When the purity of hydrogen used as the fuel for converting hydrogen into electric power using the PEM fuel cell is poor, the electrodes are poisoned and decrease the output power of the cell, shortening the service life of the cell. Therefore, contamination of hydrogen is a fatal drawback.

The most efficient utilization of energy as the major energy source is accomplished by compressed hydrogen by which the volume of the hydrogen is compressed under a high pressure to enable the hydrogen to be readily stored and transported. The hydrogen can be used as a substitute of the fossil fuels when hydrogen used as an energy source is converted into high pressure hydrogen by reducing its volume for the convenience of storage and transport. Various methods of PEM electrolysis have been studied as suitable methods for generating the high pressure hydrogen by only electrolysis without using a gas compressor. Various methods have been proposed with respect to the device for generating high pressure hydrogen required for utilizing hydrogen as an energy source by only electrolysis, particularly for solving the problem of low pressure resistance of the electrolysis cell.

For example, it was noticed in Japanese Patent Publication No. 3,220,607 (U.S. Pat. No. 5,690,797) that the force acting on the PEM of the double-polarity multi-layered type electrolysis cell is a differential pressure between hydrogen generated in the cathode and oxygen generated in the anode, and that the force acting on the seal member of the cell is a differential pressure between the combined pressure of hydrogen and oxygen in the cell and external pressure of the cell. Therefore, the cell is submerged in pure water in the high pressure vessel for storing pure water and oxygen in order to control the pressure in the high pressure vessel for storing hydrogen and the pressure of the high pressure vessel for storing oxygen to be equal. The differential pressures acting on the PEM and seal member of the cell are controlled within the pressure resistance of the cell. Consequently, only a differential pressure within the pressure resistance of the cell acts on the cell even when hydrogen and oxygen is generated at a combined pressure exceeding the pressure resistance of the cell, thereby enabling high pressure hydrogen to be generated.

However, corrosion of metallic parts should be considered in the device for generating the hydrogen and oxygen gases. The electrolysis cell is submerged in pure water by housing it in the high pressure vessel while storing oxygen generated at the anode in the high pressure vessel. Therefore, the electrolysis cell having the electrodes is sealed in an environment containing high pressure oxygen, that readily causes corrosion of metals, and water together as the pressure is increased.

Furthermore, corrosion of the metallic parts, such as the electrodes, are liable to occur as the temperature is increased in the permissible range of heat resistance of PEM. In addition, the leak current cannot be ignored since the resistivity of pure water in which the PEM electrolysis cell is submerged decreases. When the problem of temperature increase is solved by cooling pure water in which the PEM electrolysis cell is submerged by using a heat exchanger, the cell is forced to be operated at a temperature of 40° C. or less where the cell efficiency becomes poor, and the operating condition is disadvantageous for effective utilization of heat.

Therefore, this proposal involves inherent problems to be solved such as electrolytic corrosion by oxygen and leak electric current by the decrease of resistivity of pure water, in order to generate high pressure hydrogen required for utilizing hydrogen as an energy source.

When abnormalities, such as a break of PEM isolating the anode compartment of the electrolysis cell from its cathode compartment, or a break of the seal member of the electrolysis cell occur, a large amount of hydrogen is mixed with oxygen in the high pressure cell housing the electrolysis cell, arising a danger of generating a detonating gas. Therefore, a countermeasure for this danger is also required.

Accordingly, while the generation of high pressure hydrogen with a pressure of as high as several hundreds of atm or more is possible in principle in this device for generating hydrogen and oxygen, the device is currently only applicable for generating hydrogen with a pressure of several tens of atm, and it is not easy to generate high pressure hydrogen with a pressure of several hundreds atm that is considered necessary for utilizing hydrogen as an energy source.

A part of the electric current flowing in the electrolysis cell flows in pure water in which the electrolysis cell is submerged by the decrease of resistivity of pure water, even when the problem of corrosion of metals is solved, thereby decreasing electrolysis efficiency due to electric power loss. Moreover, since pressure resistance and heat resistance of the ion-exchange resin are low, another problem is that the decreased resistivity as a result of the decreased purity of pure water in the high pressure vessel cannot resume its original high resistivity by regenerating contaminated pure water into pure water using an ion-exchange resin. In particular, this is a serious problem because the electrolysis efficiency is enhanced by increasing the temperature to about 80° C. or more.

While pure water should always be regenerated with the ion-exchange resin due to accelerated dissolution of wall substances of the vessel into pure water when the temperature of pure water is increased for decreasing resistivity, the pressure of the cell is restricted because the ion-exchange resin is broken by treating pure water under a high pressure. Consequently, it was difficult to generate high pressure hydrogen required for utilization of hydrogen as a energy source.

For solving these problems, Japanese Unexamined Patent Application Publication No. 2001-130901 has proposed a hydrogen energy feed device constructed so that electrical insulation is not compromised even at a high electrolysis temperature, wherein hydrogen and oxygen generated by electrolysis are stored in separate high pressure tanks while hermetically immersing the electrolysis cell in an electrically insulating liquid in an exclusive high pressure vessel in order to prevent corrosion of metals, such as the electrode, due to coexistence of oxygen and water at a high temperature and pressure.

This method not only settles both problems of corrosion by electrolysis and decrease of resistivity of pure water at once, but is also able to prevent the detonating gas from being generated since pure water serves to isolate oxygen from hydrogen even when the electrolysis cell is broken, thereby greatly improving safety of the cell.

However, this method is still difficult to practically employ since no practically available electrically insulating liquid for immersing the electrolysis cell in the high pressure vessel has not been found yet.

A vast quantity of electrically insulating liquid is needed for covering the demands of the device for generating enough hydrogen to be converted into the vast amount of energy that is supposed to be consumed. However, it is difficult to chemically synthesize and use a large quantity of the electrically insulating liquid without any burden to the environment, or so that the environment, particularly groundwater and soil, is not readily polluted by leakage. Moreover, the liquid is required to be incombustible and chemically stable so that the liquid is not reactive with a minute quantity of oxygen and hydrogen leaking from the electrolysis cell while having no danger of explosion by reacting with oxygen even when a large quantity of oxygen is leaked in the high pressure vessel. Such electrically insulating liquids that satisfies these conditions have not been found.

For example, although PCB is a flame-retarded liquid with excellent performances, its production and use are forbidden from the view point of public hazard and environmental pollution. Therefore, all the currently available insulating oils are inflammable, and involve a potential danger of explosion when oxygen is leaked.

In addition, pure water is difficult to use since the resistivity of pure water changes with time, as described above, although pure water itself is excellent as a insulating liquid.

Since pure water has a potential to dissolve all the substances, the resistivity of pure water is gradually decreased when pure water is sealed in the high pressure vessel. This decrease of resistivity not only decreases efficiency of the cell due to a leak electric current generated, but also hydrogen and oxygen are generated by the leak electric power in the high pressure vessel housing the electrolysis cell increasing the pressure. This increase of the pressure may cause a potential danger by which the electrolysis cell may be finally crushed by the pressure, or the mixed gas of hydrogen and oxygen may explode. Therefore, countermeasures for these potential dangers should be provided.

SUMMARY OF THE INVENTION

Accordingly, the object of the invention by the inventors, considering the situations as described above, is to provide a system and method for generating high pressure hydrogen, wherein high pressure hydrogen, in particular having a pressure of as high as 350 atm or more required for utilizing hydrogen as an energy source, can be efficiently generated without using a gas compressor. Such hydrogen can be stably and safely generated only by electrolysis using electric power generated by a frequently varying natural energy such as sunlight.

Accordingly, it was found that high pressure hydrogen can be generated only by electrolysis comprising the steps of providing an electrolysis cell using PEM in a high pressure vessel under a hydrogen atmosphere, electrolyzing pure water using the electrolysis cell, storing hydrogen generated at the cathode in the high pressure vessel housing the electrolysis cell, and storing oxygen generated at the anode in a high pressure vessel for storing electrolysis pure water together with returned pure water. Consequently, a system and a method for generating high pressure compressed hydrogen with a pressure of 350 atm or more, which is required for utilizing hydrogen energy, have been established.

In the generation system and method as described above, pure water is electrolyzed using the electrolysis cell, while adjusting the differential pressure between the pressure of the high pressure vessel for storing hydrogen and the pressure of the high pressure vessel for storing oxygen and electrolysis pure water to be lower than the pressure resistance of PEM constituting the electrolysis cell. Hydrogen and oxygen obtained are stored, and pure water is supplied to the oxygen side of the electrolysis cell after cooling it with a heat exchanger. In addition, hydrogen generated in the electrolysis cell is returned into the high pressure vessel after cooling with the heat exchanger disposed at the outside of the high pressure vessel. It was found that the process above enables the electrolysis cell to be more stably operated since the electrolysis cell is prevented from being heated by energy loss in the electrolysis process.

The electrolysis efficiency is more improved as the temperature is higher in the PEM electrolysis method. Although PEM used for PEM electrolysis is made of polymer materials having a relatively high heat resistance comparable to conventional plastics, its mechanical strength decreases when the temperature exceeds 100° C. with a rapid decrease at 120° C. or more. Since the desirable temperature for operating the electrolysis cell is 80° C. or less, the heat generated by electric power loss as a result of electrolysis of water is removed in the operation of the PEM electrolysis cell. In addition, it was found that the temperature in the PEM electrolysis system can be efficiently and precisely controlled by forming the piping lines of hydrogen and oxygen in the heat exchanger, as well as the piping line of a heating medium, into branched fine tubes in order to increase heat conductivity with a wide heat conduction area, thereby ensuring a sufficiently high pressure resistance and heat conductivity. This is advantageous for electrolyzing at a prescribed temperature, preferably at about 80° C., by the electric power generated by solar energy as a clean energy in the future. Another advantage of this method is to prevent the temperature of pure water in the cell from decreasing to below 0° C. as the freezing temperate of water when operation of the electrolysis cell for generating hydrogen by electrolysis of water is halted at night in cold provinces or in the winter season.

A novel method for sealing through-holes for pulling thin fine tubes out of a thick high pressure vessel has been additionally invented.

For suppressing the force acting on the electrolysis cell within the pressure resistance of the electrolysis cell, the difference between the pressures of hydrogen and oxygen acting on the electrolysis cell should be controlled to be within the pressure resistance of the electrolysis cell. However, since the pressure resistance of the electrolysis cell is limited, a higher accuracy for controlling the pressure is required, as shown below, as the pressures of oxygen and hydrogen acting on the electrolysis cell increase. The conventional pressure control methods, or pressure control by transfer of hydrogen and oxygen, may become an impossible to comply with the requirement. Accordingly, it was found that the pressure can be effectively controlled by allowing pure water contained in the high pressure vessels for storing hydrogen and oxygen to be transferred from a vessel having a higher pressure to another vessel having a lower pressure, in place of pressure control by transfer of hydrogen or oxygen as a gas, or by using both methods together.

A pressure controller applicable for the pressure control method has also been developed.

The following equation (1) is valid among the precision S(%) for controlling the differential pressure, the pressure resistance Ps of the electrolysis cell and the pressure P of hydrogen (or oxygen) generated in the electrolysis cell. This equation means that a high pressure control accuracy is required in the system and method for generating the high pressure hydrogen.

$$S > (Ps/P) \times 100 \tag{1}$$

The equation (1) above show that it is necessary to increase either Ps or the precision S(%) for controlling the differential pressure, or to increase Ps and S, in order to increase the pressure P of hydrogen or oxygen generated. However, since the accuracy S for controlling the differential pressure is currently limited, the pressure P of hydrogen or oxygen available is eventually determined by the pressure resistance Ps of the electrolysis cell.

While the allowable pressure resistance of the currently available electrolysis cell is generally about 4 atm, the accuracy for controlling the pressure may be within $4/10$, or within 40%, when the pressure of oxygen or hydrogen generated is about 10 atm. Accordingly, the method conventionally used for controlling the pressure can be employed with no danger of breaking the electrolysis cell. Therefore, a pressure of about 350 atm that is required for utilizing hydrogen as an energy source can be applied in the conventional electrolysis cell at present.

However, a highly precise control of the pressure with an accuracy of $4/400$ or more, or 1% or more, is required for more stably and safely generating hydrogen at a pressure of 350 atm, or for generating hydrogen and oxygen at a pressure required hereinafter, or a pressure of 400 atm for example, using the electrolysis cell. This accuracy is hardly attainable by the conventional method for controlling the pressure, and a more strict control of the pressure would be required, because hydrogen compressed under a pressure of about 700 atm will be needed in the future.

The inventors have investigated a method for excluding the factors that make the pressure resistance of the electrolysis cell decrease, as well as the method for controlling the pressure by transferring pure water, and found that the electrolysis cell having a novel structure as will be described hereinafter is effective for improving the pressure resistance of the electrolysis cell. This structure permits the diameter of the high pressure vessel housing the electrolysis cell to be small. In addition, the high pressure vessel can be formed with a wall as thin as possible, although the thickness of the wall has been required to be thick in response to the pressure generated, or the thickness of the high pressure vessel was required to be larger as the pressure is higher, or the thickness was required to be increased in proportion to the square of the diameter of the vessel. Therefore, the improvement of the structure permits easy manufacture and handling of the vessel, rendering the vessel to be advantageous in its manufacturing cost.

It was found that the following structure is effective for exhibiting the effects as described above:

(1) the double polarity multi-layered type electrolysis cell is fixed by compression by a compression pressure of a compressing member;

(2) hydrogen and permeating pure water generated at the cathode are directly discharged into the high pressure hydrogen vessel from each cathode of the cell by providing a discharge port communicating with the cathode at the side wall of the double polarity electrode; and (3) pure water to be electrolyzed is supplied through a pure water feed passageway formed by a hole provided at the center of the cell.

A water level meter was also developed, by taking advantage of a large difference of electrical conductivity between a gas such as oxygen and pure water, in order to solve the following problems encountered in the measurement of the water level in the vessel in the presence of a high pressure gas, and for improving the accuracy of pressure control.

While pure water used for electrolysis and oxygen generated by electrolysis are stored in the high pressure vessel together, it may be commonly conjectured that water is stored at the bottom half and oxygen is stored at the top half in the vessel because the density of oxygen is $1.429 \times 10^{-3}$ g/cc at the standard conditions (0° C. and 1 atm).

However, oxygen has a density equal to the density of water at a pressure of 700 atm from the calculation of $1/(1.429 \times 10^{-3})=700$ with the proviso that oxygen is an ideal gas. This mean that water floats on oxygen at a pressure of higher than 700 atm, and an empirical rule that a gas is lighter than water is not valid.

Fortunately, such inversion of the density does not occur unless the pressure is 1000 atm or more considering the size of the oxygen molecule and intermolecular force of oxygen. However, a widely used float type level meter cannot accurately sense the water surface due to unstable movement of the float caused by water stream and other factors when the difference of density between water and oxygen becomes small. In addition, the durability of the float to be used in the float type level meter against the pressure should be taken into consideration, because the float used for the float type level meter is required to have an apparent specific gravity of less than 1. Therefore, manufacture of a float durable to a pressure required in utilization of the hydrogen energy has been considered to be difficult.

The inventors have developed a level meter that can be stably operated under high pressure for solving these problems, in order to steadily and widely implement the method for generating high pressure hydrogen according to the invention.

The invention completed as described above provides a system for generating high pressure hydrogen comprising an electrolysis cell disposed in a high pressure vessel that also serves as a storage tank of hydrogen generated. The electrolysis cell comprises polyelectrolyte membranes for generating hydrogen and oxygen by electrolysis of pure water.

The invention also provides a system for generating high pressure hydrogen comprising two high pressure vessels including a high pressure vessel for storing hydrogen generated and a high pressure vessel for storing electrolysis pure water and oxygen generated. An electrolysis cell comprising polyelectrolyte membranes for generating hydrogen and oxygen by electrolysis is disposed in the high pressure vessel for storing hydrogen generated, and the high pressure vessel for storing electrolysis pure water and oxygen generated communicates with the electrolysis cell.

Preferably, the system for generating high pressure hydrogen has a pressure control device for controlling a differential pressure between the inner pressure of the high pressure vessel for storing hydrogen and the inner pressure of the high pressure vessel for storing oxygen to a pressure below the pressure resistance of the electrolysis cell.

Preferably, the system for generating high pressure hydrogen has a pressure control device provided for measuring the pressures of respective high pressure vessels and adjusting the differential pressure to a pressure below the pressure resistance of the electrolysis cell by discharging hydrogen or oxygen through the valves provided at respective high pressure vessels being switched based on the measured values.

Preferably, the system for generating high pressure hydrogen has a pressure control device provided for adjusting the differential pressure to a pressure below the pressure resistance of the electrolysis cell by allowing pure water to be transferred by switching the valves in the vessels connected to the pipe lines communicating with pure water in respective high pressure vessels.

Preferably, the system for generating high pressure hydrogen has a pressure control device provided in the pipe line communicating with pure water filled in each high pressure vessel and the pressure is controlled by the pressure control device having a slider that slides depending on the differential pressure of pure water in each high pressure vessel.

Preferably, the electrolysis cell in the system for generating high pressure hydrogen is a double polarity multi-layered type cell comprising a plurality of laminated double polarity electrodes having catalyst layers on both surfaces thereof, and the electrolysis cell is placed on a mounting table in the high pressure vessel so as to be compressed with compression jigs from above the table.

The present invention also provides a method for generating high pressure hydrogen, wherein an electrolysis cell comprising polyelectrolyte membranes is disposed in a high pressure vessel, and hydrogen and oxygen are generated by electrolysis of pure water using the electrolysis cell. Hydrogen generated is stored in the high pressure vessel containing the electrolysis cell, and oxygen is stored in a high pressure vessel for storing electrolysis pure water together with returned pure water.

Preferably, hydrogen generated is cooled before storing in the high pressure vessel containing the electrolysis cell.

Preferably, the differential pressure between the inner pressure of the high pressure vessel for storing hydrogen and the inner pressure of the high pressure vessel for storing oxygen and pure water is adjusted below a pressure of the pressure resistance of the polyelectrolyte membrane constituting the electrolysis cell in the electrolysis process. The pressure is preferably controlled by adjusting the hydrogen pressure and oxygen pressure in respective high pressure vessels by discharging hydrogen or oxygen from the vessels and/or by transferring pure water in the vessels.

BRIEF DESCRIPTION OF THE DRAWINGS

FIG. 14a shows a partial cross section of the pressure controller in FIG. 13;

FIG. 14b shows a cross section of the pressure controller along the line A—A' in FIG. 14a;

DESCRIPTION OF THE PREFERRED EMBODIMENTS

Preferred embodiments of the system for generating high pressure hydrogen according to the invention will be described in detail hereinafter.

The invention basically provides a system and a method for generating hydrogen and oxygen by direct electrolysis of pure water using an electrolysis cell comprising an anode compartment and cathode compartment isolated from each other with a partition membrane, such as a polyelectrolyte membrane.

As described in detail above, the present invention enables high pressure hydrogen to be safely and stably generated without the use of gas compressors using a system for generating hydrogen and oxygen developed by improving the conventional system. Each member constituting the generation system is principally the same as the member known in the art.

Figure 1:
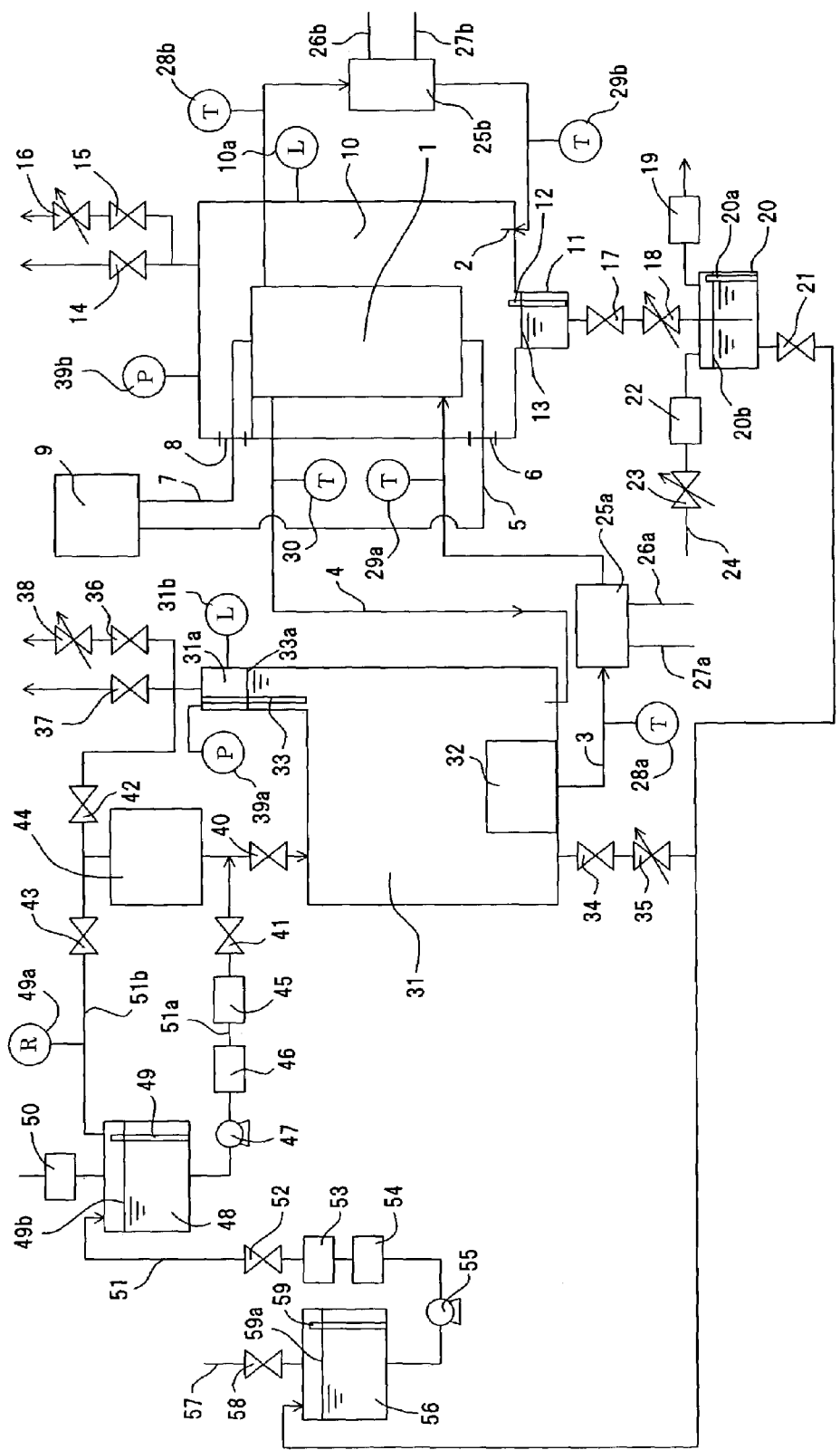
FIG. 1 is a schematic diagram showing the overall constitution of an example of the system for generating high pressure hydrogen according to the invention.

FIG. 1 is a schematic diagram showing the overall constitution of an example of the system for generating high pressure hydrogen according to the invention. The reference numeral 1 denotes an electrolysis cell placed in a high pressure vessel 10 (also referred to as a high pressure vessel for storing hydrogen since it also served as a vessel for storing hydrogen as will be described hereinafter). The electrolysis cell comprises an anode compartment and a cathode compartment (not shown) partitioned with polyelectrolyte membranes (PEM) having electrodes at both ends of PEM. Pure water for electrolysis is supplied to the anode compartment of the electrolysis cell 1 through a pure water feed pipe line 3. The electrolysis cell is constructed so that oxygen and hydrogen are generated in the anode compartment and cathode compartment, respectively, of the electrolysis cell 1 by feeding electricity from a power source 9 through a cathode line 5 and an anode line 7.

Oxygen generated in the anode compartment is sent to a high pressure vessel 31 (also referred to as a electrolysis pure water tank or a high pressure vessel for storing oxygen) for storing electrolysis pure water through a return pipe line 4 together with a part of pure water supplied from a pure water feed pipe line 3, and is stored in a oxygen pool 31a having a small bottom area provided at the upper part of the electrolysis pure water tank 31.

Hydrogen generated in the cathode compartment of the electrolysis cell 1 may be directly discharged into the high pressure vessel 10 and stored in the high pressure vessel 10. However, since generated hydrogen is heated by electric power loss during electrolysis, the electrolysis cell 1 housed in the high pressure vessel 10 is heated by the heat of hydrogen when hydrogen is discharged in the high pressure vessel 10 without cooling, and PEM may be finally broken by the heat.

For preventing PEM from being broken by the heat, hydrogen generated in the electrolysis cell 1 is cooled by leading it into an external heat exchanger 25b outside of the high pressure vessel 10 through a pipe line, and hydrogen is discharged into the high pressure vessel 10, preferably into the bottom or in the vicinity thereof, through a hydrogen discharge pipe line 2. Consequently, the heat generated by the electric power loss of the electrolysis cell 1 is cooled, and hydrogen is maintained at a temperature suitable for operating the electrolysis cell.

Temperatures of hydrogen flowing in and out of the heat exchanger 25b are measured with thermometers 28a and 29b, respectively, and the temperature of hydrogen is controlled by controlling the temperature and volume of cold water sent into the heat exchanger 25b.

Since hydrogen discharged from a hydrogen discharge pipe 2 becomes heavier due to a lower temperature than the temperature of hydrogen stored in the high pressure vessel 10 by cooling the formed hydrogen with the heat exchanger 25b, cool hydrogen is collected at the bottom of the high pressure vessel 10. However, this hydrogen is lifted up by hydrogen flowing in from the hydrogen discharge pipe line 2, and ascends by reducing its specific gravity when the temperature is increased by making contact with the electrolysis cell 1. This ascending hydrogen carries the heat out of the high pressure vessel 10 through a valve 15 and needle valve 16, and the electrolysis cell 1 is efficiently cooled.

While the electrolysis cell 1 is cooled with pure water to a certain extent by feeding pure water that has been cooled at the heat exchanger 25a to the anode side, the cooling ability of this pure water is not sufficient as compared with the electrolysis cell of a known in the art PEM electrolysis system that is submerged in pure water. Therefore, it is desirable, in the construction in which the electrolysis cell 1 is housed in the high pressure vessel 10 for storing hydrogen, that hydrogen generated in the electrolysis cell 1 returns to the high pressure vessel housing the electrolysis cell 1 after cooling.

Although it is contemplated to directly discharge hydrogen into the high pressure vessel 10 by cooling the high pressure vessel itself, a wide heat conduction area is required for cooling since the heat is distributed in the high pressure vessel 10. In addition, the heat conductivity of the vessel becomes poor as the pressure is increased since the wall of the high pressure vessel 10 is required to be thick. Therefore, this method is not considered to be excellent in cooling efficiency.

The electrolysis cell can be efficiently cooled by discharging hydrogen generated in the electrolysis cell 1 as described above, since the temperature of hydrogen is not dissipated anywhere. Since hydrogen may be discharged through fine tubes having thinner wall thicknesses as compared with the wall of the high pressure vessel 10, heat conductivity is not compromised and cooling efficiency is enhanced.

Accordingly, high pressure hydrogen can be generated without placing the electrolysis cell 1 in a corrosive environment where water and oxygen exist together in the invention, while enabling cool hydrogen to be discharged from the hydrogen discharge pipe line 2 through the heat exchanger 25b by a spontaneous pressure increasing function of the electrolysis cell 1 without using a pump.

In addition, heat conductivity of hydrogen increases as the pressure in the high pressure vessel 10 increases, and the ability for cooling the electrolysis cell 1 is improved.

It is also evident that high pressure hydrogen can be stably and efficiently generated in this invention. According to the present invention, in particular, hydrogen warmed by the electrolysis cell 1 ascends and reaches the upper part of the high pressure vessel 10 by returning hydrogen cooled in the heat exchanger 25b to the bottom of the high pressure vessel 10, and is released through a valve 15 and needle valve 16 together with extracted heat. Accordingly, cooling efficiency of the electrolysis cell is high enough to enable a highly efficient system for generating high pressure hydrogen to be designed.

Hydrogen generated in the electrolysis cell 1 as described above is discharged into the high pressure vessel 10 from the hydrogen discharge pipe line 2, and collected and stored in the high pressure vessel 10.

When electric power is continuously supplied from the power source 9 to the electrolysis cell 1 through the cathode line 5 and anode line 7, pure water is continuously electrolyzed to generate oxygen and hydrogen. Oxygen is collected in the oxygen pool 31a of the electrolysis pure water tank 31 while hydrogen is collected in the high pressure vessel 10, and the pressure of the tank and vessel are elevated.

The pressures of oxygen and hydrogen are measured by pressure gauges 39a and 39b, respectively, provided at the electrolysis pure water tank 31 and high pressure vessel 10, respectively. The measured values are compared with each other using an independently provided controller (not shown). When the pressure of oxygen is higher then the pressure of hydrogen, for example, a valve 36 is automatically opened by a control signal from the controller, and oxygen is released through a needle valve 38 to discharge in the air or to be retrieved in the vessel. When the pressure of oxygen is equal to the pressure of hydrogen, on the other hand, the needle valve 36 is closed by operating the controller. The aperture of the needle valve 38 is automatically controlled by the controller depending on the magnitude of the differential pressure between oxygen and hydrogen.

Hydrogen and oxygen are generated in a proportion of 2:1 in volume by electrolyzing pure water in the electrolysis cell 1. When pure water is continuously electrolyzed by closing the valves 36 and 37 communicating with the oxygen pool 31a, and by closing the valves 14 and 15 communicating with the high pressure vessel 10 without discharging hydrogen and oxygen to the outside, the pressure of hydrogen in the high pressure vessel 10, and the pressure of oxygen in the oxygen pool 31a formed in the electrolysis pure water tank 31 are elevated.

Since the present invention is directed toward the control of high pressure hydrogen as a hydrogen energy source, it is preferable that the volume of oxygen collected in the oxygen pool 31a is controlled so that the volume is 4% or less of the volume of the high pressure vessel 10 by observing the water level 33a, in order to safely prepare high pressure hydrogen. Excess oxygen is released through the needle valve 38, and the pressures are controlled so that the pressure of oxygen is always equal to the pressure of hydrogen, or so that the differential pressure between oxygen and hydrogen is at least within the pressure resistance of the electrolysis cell, or within 2 atm, with the pressure of oxygen being a little higher than the pressure of hydrogen.

When the pressures of hydrogen and oxygen reach respective prescribed pressures, the controller automatically stops the electric power from the power source 9 to the electrolysis cell 1, and electrolysis is stopped with a halt of pressure increase.

The pressures of hydrogen and oxygen in the high pressure vessel 10 and oxygen pool 31a, respectively, are controlled as described above with uniform pressures, wherein the oxygen pressure is a little higher, and the differential pressure between oxygen and hydrogen is controlled at least within the pressure resistance of the electrolysis cell. Accordingly, the differential pressure between the inside and outside of the electrolysis cell 1, and the pressure acting on the partition membrane (a membrane having platinum electrodes on PEM) isolating the anode compartment from the cathode compartment in the electrolysis cell 1 are controlled to be within the pressure resistance of the membrane. Consequently, the partition membrane is not broken and there is no leak of hydrogen and oxygen.

The partition membrane may happen to be broken, or a part of the seal member of the electrolysis cell 1 may happen to be broken for certain reasons. However, the pressure of oxygen can be balanced with the pressure of hydrogen by permitting a small volume of pure water in the electrolysis pure water tank 31 to flow into the high pressure vessel 10, by connecting both the pure water feed pipe line 3 and return pipe line 4 connected to the electrolysis cell 1 to the bottom of the electrolysis pure water tank 31, and by controlling the pressure of oxygen in the oxygen pool 31a to be a little higher than the pressure of hydrogen in the high pressure vessel 10. Consequently, excess pure water is prevented from flowing into the high pressure vessel, and a mixed gas of hydrogen and oxygen is not formed, thereby rendering the process quite safe.

Furthermore, when the volume of hydrogen in the oxygen pool 31a is suppressed to be 4% or less of the volume of the high pressure vessel 10, it cannot be anticipated that the oxygen in the electrolysis pure water tank 31 is mixed with hydrogen in the high pressure vessel 10 even under any predictable breakage conditions.

If oxygen in the oxygen pool 31a is accidentally mixed with hydrogen in the high pressure vessel 10, and the concentration of hydrogen never exceeds a lower explosion limit of 4%, a gas explosion never happens.

The descriptions above are only valid when normal electrolysis of water is not maintained. Usually, a safety OFF mode of the power source (see Handbook of Safety Precautions and Control in Manufacture of Semiconductors, Harada et. al., published by Realize Co., 1993) functions immediately after the controller senses an abnormal electric current or abnormal voltage, and operation of the generation system is stopped to ensure safety.

Damage greater than breakage of the electrolysis cell 1 cannot happen by at least preventing an explosion caused by the mixing of hydrogen and oxygen.

The mixing of oxygen and hydrogen due to an abnormal state of the electrolysis cell 1, which is a level not detectable as abnormal by monitoring the current and voltage of the controller, can be sensed with an oxygen transducer 10a and a hydrogen transducer 31b, and operation of the hydrolysis cell is urgently stopped. Therefore, high pressure hydrogen required for utilizing hydrogen as an energy source can be safely generated.

Since the electrolysis cell 1, the cathode line 5 and anode line 7 for feeding electricity to the cell, and the electrode terminals 6 and 8 are all placed in a high pressure hydrogen atmosphere, problems of electrolytic corrosion can be avoided.

When hydrogen is used, the valve 15 attached to the high pressure vessel 10 is opened by operating the controller, and hydrogen is controlled so that it slowly flows out by adjusting the aperture of the needle valve 16.

A pressure decrease in the high pressure vessel 10 is immediately sensed by the pressure gauge 39b, and electric current flows to the electrolysis cell 1 from the power source 9 under the control of the controller to start electrolysis in the electrolysis cell 1. Consequently, hydrogen with the same volume as the volume of hydrogen discharged through the valve 15 and needle valve 16 is generated, and the pressure of hydrogen resumes its initial pressure.

Since the volume of hydrogen flowing out through the valve 15 and needle valve 16 increases by slowly increasing the aperture of the needle valve 16 the pressure of hydrogen decreases. However, the pressure decrease is immediately sensed by the pressure gauge 39a, and the amount of the electric current flowing through the electrolysis cell 1 from the power source 9 increases by operating the controller, thereby resuming the initial pressure.

While the volume of hydrogen released through the valve 15 and needle valve 16 is gradually increased by keeping the pressure to be approximately constant, the pressure does not further increase even by increasing the aperture of the needle valve 16 when the amount of hydrogen consumed reaches the amount of hydrogen generated. As a result, the electric current flowing from the power source 9 to the electrolysis cell 1 stops increasing.

When the amount of hydrogen consumed exceeds the maximum amount of hydrogen that can be generated from the hydrolysis cell 1, on the other hand, the amount of generated hydrogen cannot be increased after the electric current flowing from the power source 9 to the electrolysis cell 1 has reached its maximum, and the aperture of the needle valve 16 does not further increase. Therefore, the hydrogen demand exceeds the maximum amount of hydrogen that can be generated from the hydrolysis cell 1.

While the pressure of the high pressure vessel 10 is maintained at a prescribed pressure, the valves 14 and 37 are opened when the pressure in the high pressure vessel 10 needs to be urgently decreased in an emergency allowing hydrogen in the high pressure vessel 10 and oxygen in the oxygen pool 31a of the electrolysis pure water tank 31 to be urgently discharged.

The valve 36 is opened by automatically operating the controller when the differential pressure between hydrogen and oxygen increases by the release of hydrogen. Oxygen is discharged through the needle valve 38 so that the pressure of hydrogen in the high pressure vessel 10 balances the pressure of oxygen in the oxygen pool 31a of the electrolysis pure water 31, so that the differential pressure between hydrogen and oxygen at least falls within the pressure resistance of the electrolysis cell with a little higher pressure of oxygen than the pressure of hydrogen.

Although the descriptions above may give an impression that the apertures of the needle valves 16 and 38 and electric current flowing from the power source 9 to the electrolysis cell 1 are controlled too slowly, they are all controlled by a computer at a high speed. Since the control speed is sufficiently high as compared with the speed of variation of the natural energy, the controller can follow the change of the natural energy. Accordingly, there are no problems in generating hydrogen using the system for generating high pressure hydrogen according to the invention even when using electric power generated by natural energy that is frequently changed.

While hydrogen is discharged in the high pressure vessel 10 from the hydrogen discharge pipe line 2, the discharged hydrogen contains a small amount of water, and the water is collected in a water pool 11 at the bottom of the high pressure vessel 10.

The amount of water is always monitored with a level meter 12 when a prescribed amount of water is collected a valve 17 is opened to discharge it into a water reservoir 20 through a needle valve 18. The discharge of water stops by closing the valve 17 when the water level descends to a prescribed level.

Since hydrogen is dissolved in water discharged from the high pressure vessel 10, hydrogen is also collected in the water reservoir 20. A controlled flow rate of nitrogen is supplied into the water reservoir 20 by a needle valve 23 from a pipe line 24 through a filter 22, and the nitrogen is discharged into the air through a filter 19. Since the water reservoir is designed to be isolated from the air by the filter 19, microorganisms never mingle in the water reservoir 20.

While the feed of pure water into the electrolysis cell 1 is not particularly restricted, pure water is supplied into the electrolysis cell by means of a water feed pump 32 disposed in the electrolysis pure water tank 31 as in the embodiment shown in FIG. 1.

The water feed pump 32 comprises an induction motor and propeller type water feed pump integrated into one unit, and details thereof will be described hereinafter with reference to drawings.

Pure water discharged from the water feed pump 32 is sent into the electrolysis cell 1 after being cooled with the heat exchanger 25a placed in the midway of the pure water feed pipe line 3.

The temperatures of pure water supplied to and released from the heat exchanger 25a are measured with the thermometers 28a and 29a provided so as to cooperate with the heat exchanger 25. The electrolysis cell 1 is designed so as to be able to electrolyze at a desired temperature by controlling the amount of cool water supplied from a refrigerator (not shown) through a cool water feed pipe line 26a using the controller.

Since pure water collected in the electrolysis pure water tank 31 is consumed by being decomposed into hydrogen and oxygen in the electrolysis cell 1, the water surface is continuously monitored with the level meter 33, and pure water is replenished from the pure water replenishing tank 44 considering that the volume of oxygen in the oxygen pool 31a is preferably within 4% of the volume of hydrogen in the high pressure vessel 10.

While replenishment of pure water is controlled with the controller, the valves 40 and 42 provided between the electrolysis pure water tank 31 and pure water replenishing tank 41 are closed at first since the electrolysis pure water tank 31 is communicating with a pure water storage tank 48 through a feed pipe line 51a and return pipe line 51b.

Then, the valve 41 of the feed pipe line 51a and the valve 43 of the return pipe line 51b are opened, and pure water is circulated through an ion-exchanger tower 46, a filter 45, the pure water replenishing tank 44, the return pipe line 51b and the pure water storage tank 48, in this order, by operating a pump 47. When the resistivity of pure water, as measured with a resistivity meter 49a provided in the pure water replenishing tank 44, indicates a prescribed resistivity, the valves 41 and 43 are closed and the pump 47 is stopped, thereby filling the pure water replenishing tank 44 with pure water having a high resistivity without containing any bubbles.

Then, the pure water replenishing tank 44 is pressurized by the pressure of oxygen in the oxygen pool 31a of the electrolysis pure water tank 31 communicating with the pure water replenishing tank by opening the valves 40 and 42. However, since no gas component is present in the pure water replenishing tank 44 filled with pure water, substantially no volume change is observed with negligible changes of the pressure. Therefore, pure water in the pure water replenishing tank 44 spontaneously falls down into the electrolysis pure water tank 31 by gravity, and high pressure oxygen in the electrolysis pure water tank 31 enters the pure water replenishing tank 44 by replacing pure water.

The valves 40 and 42 are closed by confirming that pure water in the pure water replenishing tank 44 has flowed into the electrolysis pure water tank 31, and that the water level 33a has returned to its original level using the level meter 33. When the valve 43 is closed, high pressure oxygen in the pure water storage tank 48 is discharged into the air through a filter 50, and the pressure of the pure water storage tank 44 returns to the atmospheric pressure.

Subsequently, the valve 41 is open and pure water is circulated by actuating the pump 47 to fill the pure water replenishing tank 44 with pure water, thereby replenishing the electrolysis pure water tank 31 with pure water again.

Since the pure water storage tank 48 communicates with a water tank 56 through a feed pipe line 51, a pump 55 is automatically operated when the water level of the pure water storage tank 48 descends by replenishing pure water into the pure water replenishing tank 44. Replenishing water such as city water is supplied into the pure water storage tank 48 and is converted into pure water through the ion-exchanger tower 54, filter 53 and valve 52 provided in the midway of a feed pipe line 51.

Figure 2:
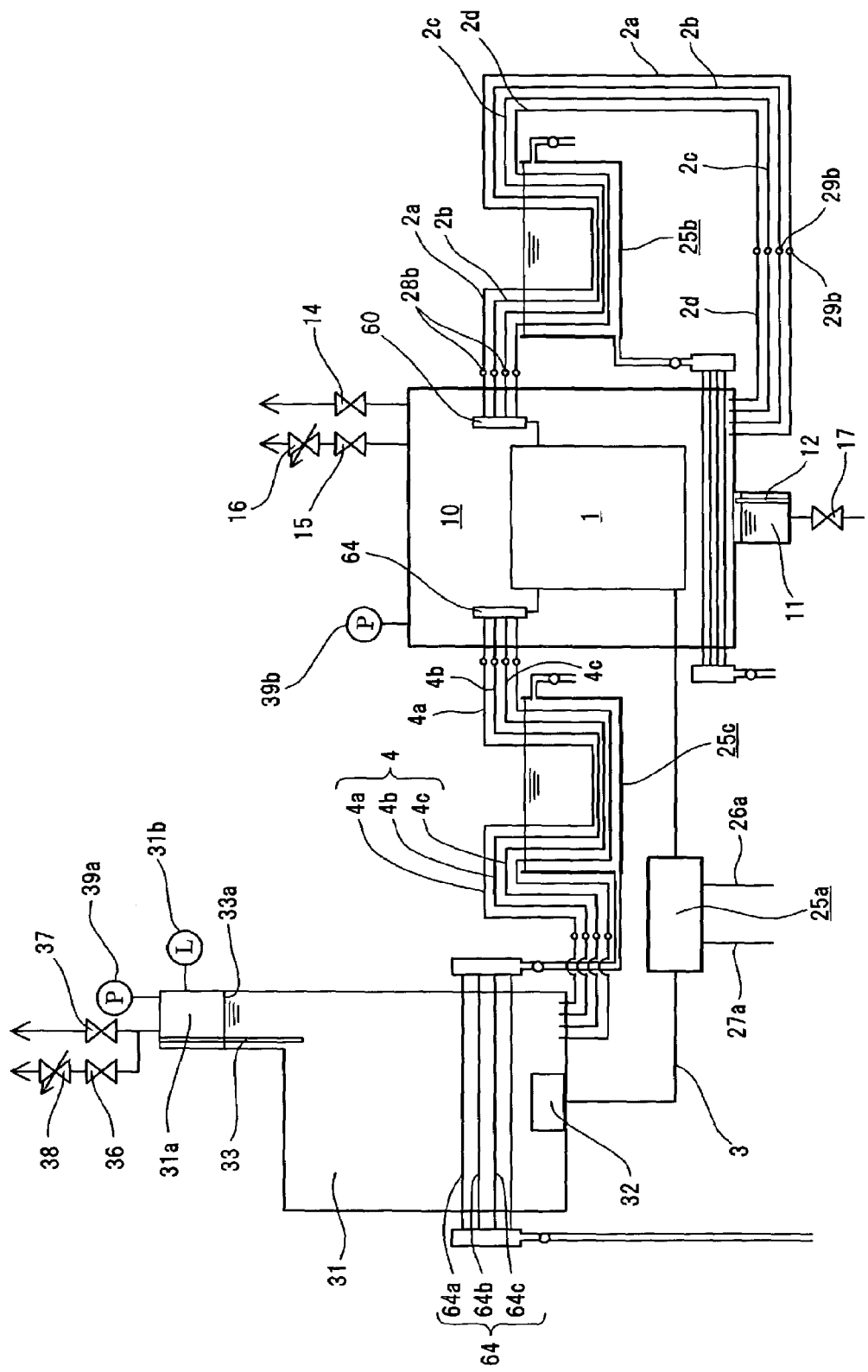
FIG. 2 is provided for illustrating an example of pipe lines disposed for enhancing the cooling effect in the system for generating high pressure hydrogen shown in FIG. 1.

FIG. 2 shows piping in the main part of the system illustrating an example of piping for enhancing cooling effects.

In this example, hydrogen generated is introduced into the outside of the high pressure vessel 10 through a plurality of fine tubes 2a, 2b, and so on, branched from the hydrogen discharge pipe line 2 by means of a branching pipe line 60 disposed at the upper part of the high pressure vessel 10. Hydrogen is discharged again into the high pressure vessel 10 from the bottom of the pressure vessel 10 after allowing it to pass through the heat exchanger 25b disposed at the midway of the plural fine tubes. Using the fine tubes permits the heat conduction area to be increased while enhancing the pressure resistance of the piping itself.

It is quite important to keep a hermetic property at the branching points when the hydrogen discharge pipe line 2 is branched into the fine tubes 2a, 2b, and so on, from the high pressure vessel 10. Accordingly, a novel method is employed in the invention, wherein through-holes that penetrate the wall of the high pressure vessel 10, into which the fine tubes 2a, 2b, and so on, are inserted, are formed into tapered shapes from the inside of the high pressure vessel 10, and the fine tubes are hermetically sealed without welding by sealing the tapered holes with wedge-shaped cores.

The temperature of hydrogen flowing in and out of the heat exchanger 25b is measured with thermometers 28b attached at the inlet side of the fine tubes 2a, 2b, and so on, to the heat exchanger 25b, and thermometers 29b attached at the outlet side of the fine tubes 2a, 2b, and so, from the heat exchanger 25b. The temperature of hydrogen is controlled by controlling the temperature and flow rate of cooling water sent into the heat exchanger 25b.

Cooling water can be also utilized for cooling hydrogen in the high pressure vessel 10 by passing cooling water through the fine tubes provided in the high pressure vessel 10, preventing pure water in the electrolysis cell 1 and water pool 11 from freezing during the halting period.

The temperature of cooling water is usually in the range of about 10 to 20° C., and cooling water is supplied from a cooling water tank with a pump. Cooling water may be used for cooling the electrolysis cell 1 to a temperature of, for example, 80° C. or less when it generates a heat by electrolysis of water, while also warming the cell at 0° C. or more when freezing of the electrolysis cell 1 is a concern during the halt period of the electrolysis cell 1.

Pure water in the electrolysis pure water tank 31 may be supplied to the anode side of the electrolysis cell 1 after cooing it with the heat exchanger 25a. The return pipe line 4 is also branched into a plurality of fine tubes 4a, 4b, and so on, at a branching pipe line 64 disposed at the upper part of the high pressure vessel 10 as shown in FIG. 2 in order to control the temperature of the electrolysis cell 1, as in the hydrogen discharge pipe line 2. The temperatures of pure water as well as oxygen generated are controlled with thermometers and heat exchanger 25c, and pure water is supplied to the bottom of the electrolysis pure water tank 31 and stored there.

The temperature is controlled not only for the temperature control of the electrolysis cell 1, but also for preventing pure water within the electrolysis cell 1, electrolysis pure water tank 31 and fine tubes 4a, 4b, and so on, from freezing.

For example, when the atmospheric temperature has decreased below 0° C. at night during the halt of operation, the controller (not shown) senses the temperature decrease with the thermometers (denoted by the marks o in the drawing) provided at the fine tubes 4a, 4b, and so on, and pure water within the electrolysis cell 1, electrolysis pure water tank 31 and fine tubes 4a, 4b, and so on, is prevented from freezing by flowing pure water into the return pipe line 4 for pure water and oxygen comprising the pure water feed pipe line 3 and plural fine tubes 4a, 4b, and so on, by operating a high pressure pump 32, during the halt period of the electrolysis cell 1.

The temperature of cooling water used is usually in the range of 10 to 20° C., and cooling water is supplied from a cooling water tank (not shown) with a pump. Cooling water may be used for cooling the electrolysis cell 1 to a temperature of 80° C. or less when it is generating electricity, while serving for warming the electrolysis cell to 0° C. or more when freezing of the electrolysis cell 1 is a concern during the halt of the electrolysis cell 1.

A cooling pipe line 64 comprising a plurality of fine tubes 64a, 64b, and so on, is provided in the electrolysis pure water tank 31 for cooling pure water in the electrolysis pure water tank 31 in the invention. Consequently, the temperature of the electrolysis cell 1 can be more easily controlled while efficiently preventing pure water in the electrolysis pure water tank 31 from freezing.

Figure 3:
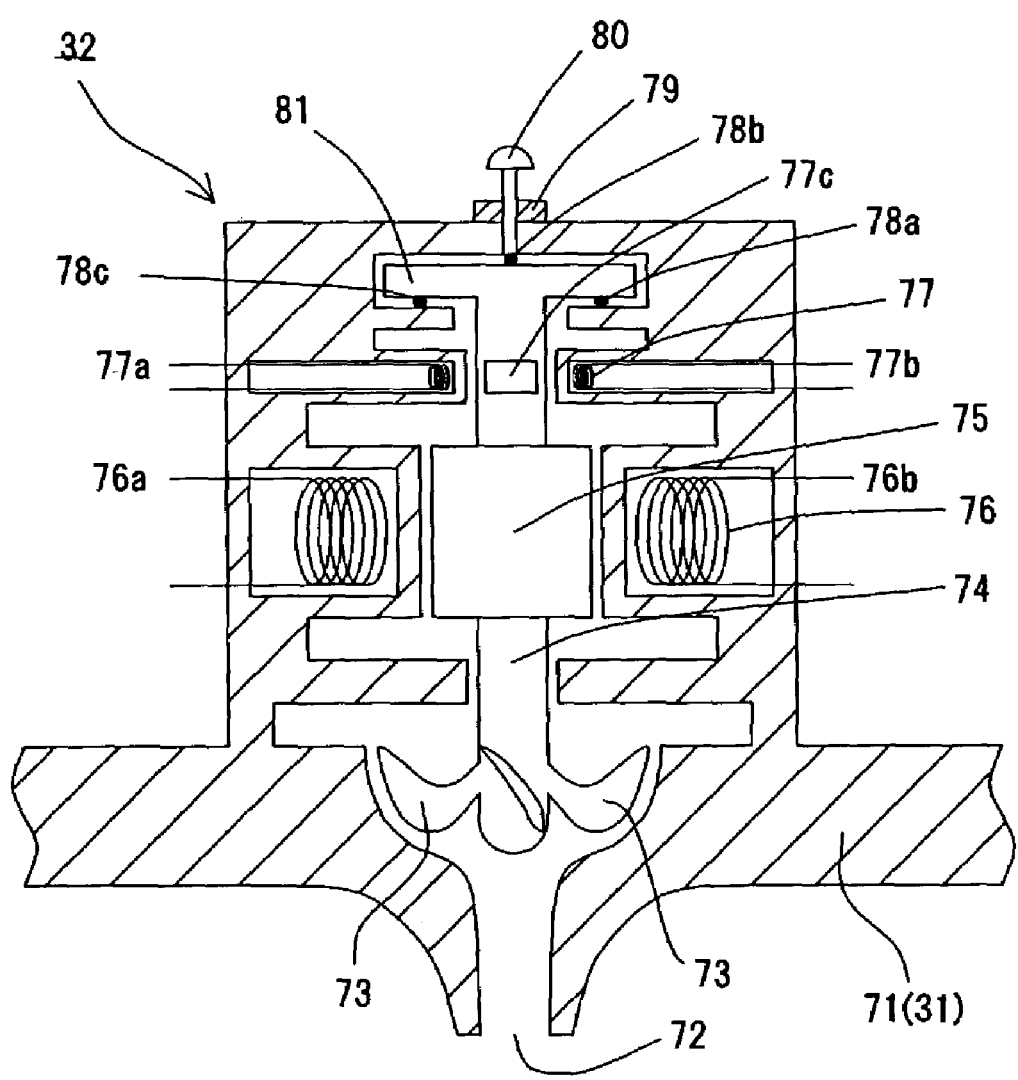
FIG. 3 is a cross section of a water feed pump powered with an induction motor as an example of the water feed pump in FIG. 1.

FIG. 3 is a cross section showing an example of a water feed pump driven with an induction motor as a representative example of the water feed pump 32. In the drawing, the reference numeral 71 denotes the bottom of the electrolysis pure water tank 31, the reference numeral 72 denotes a pure water exit port, the reference numeral 73 denotes a water feed blade, the reference numeral 74 denotes a rotation axis, the reference numeral 75 denotes a rotor, which is manufactured by integrating a laminated iron core comprising a laminated multilayer of silicon steel plates with a cage type copper coil and by coating with a resin, the reference numeral 76 denotes a drive coil prepared by winding a coil on a multilayer iron core and coating with a resin, the reference numerals 76a and 76b denote lead wires for supplying an electric current to the driving coil, the reference numeral 77 denotes a rotation sensing coil, the reference numeral 77c denotes a rotation sensing magnet, the reference numerals 77a and 77b denote lead wires for the rotation sensing coil, the reference numerals 78a to 78c denote bearings, the reference numeral 79 denotes a nut, the reference numeral 80 denotes a screw, and the reference numeral 81 denotes a bearing member.

The lead wires 76a, 76b, 77a and 77b are electrically insulated by being coated with a resin, and are guided to the outside of the electrolysis pure water tank 31 by means of electrically insulated electric current introduction terminals penetrating through the bottom 71.

The water feed pump 32 so constructed as described above starts to rotate the rotor 75 by feeding electric power to the driving coil 76 from a power source at the outside of the electrolysis pure water tank 31 together with rotation of the rotation axis 74 fixed to the rotor 75. Consequently, the blade 73 is simultaneously rotated, and pure water in the electrolysis pure water tank 31 is supplied to the feed pipe line 3 from the pure water exit port 72.

A magnet 77c embedded in the rotation axis 74 rotates together with rotation of the rotation axis 74 to flow an alternating induction current through the coil 77, and the controller can monitor the rotation speed from the number of cycles of the alternating current.

Figure 4:
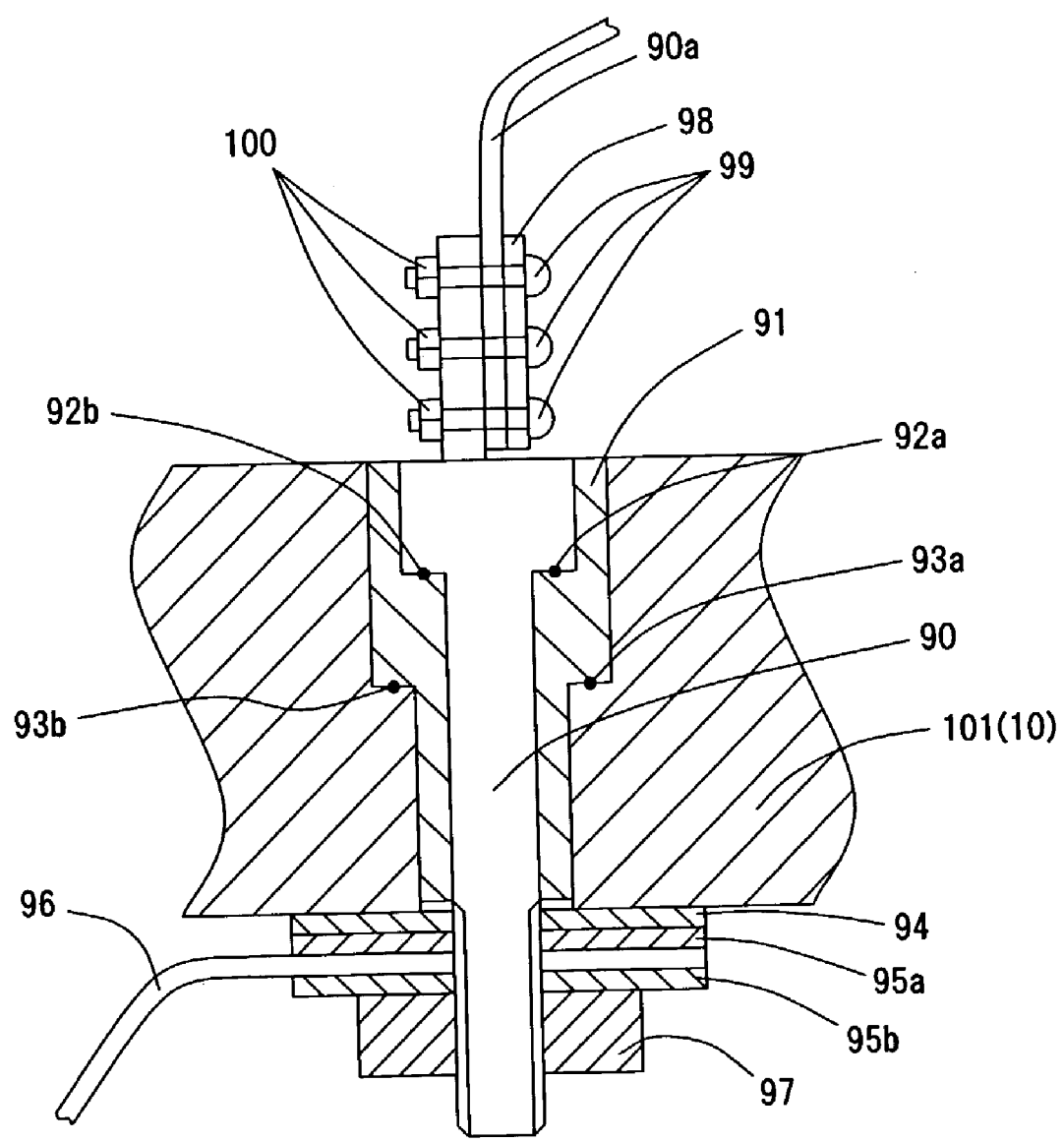
FIG. 4 shows a schematic drawing provided for describing an example of a current introduction terminal for feeding a large electric current to the electrolysis cell.

FIG. 4 shows a schematic drawing provided for describing an example of a current introduction terminal for feeding a large electric current to the electrolysis cell 1 of the system for generating high pressure hydrogen. In the drawing, the reference numeral 90 denotes a copper conductor, the reference numeral 90a denotes an inner lead wire, the reference numeral 91 denotes a resin insulator, the reference numerals 92a and 92b, and 93a and 93b denote sealing o-rings, the reference numeral 94 denotes a resin disk, the reference numerals 95a and 95b denote metal disks, the reference numeral 96 denotes a wiring terminal, the reference numeral 97 denotes a nut, the reference numeral 98 denotes a press board, reference numeral 99 denotes a screw, the reference numeral 100 denotes a nut, and the reference numeral 101 denotes a vessel wall of the high pressure vessel 10. Since the conductor 90 penetrates through the vessel wall by being electrically insulated from the electrolysis pure water vessel 31, electricity can be transferred from the outside to the inside of the electrolysis pure water vessel 31.

Figure 5:
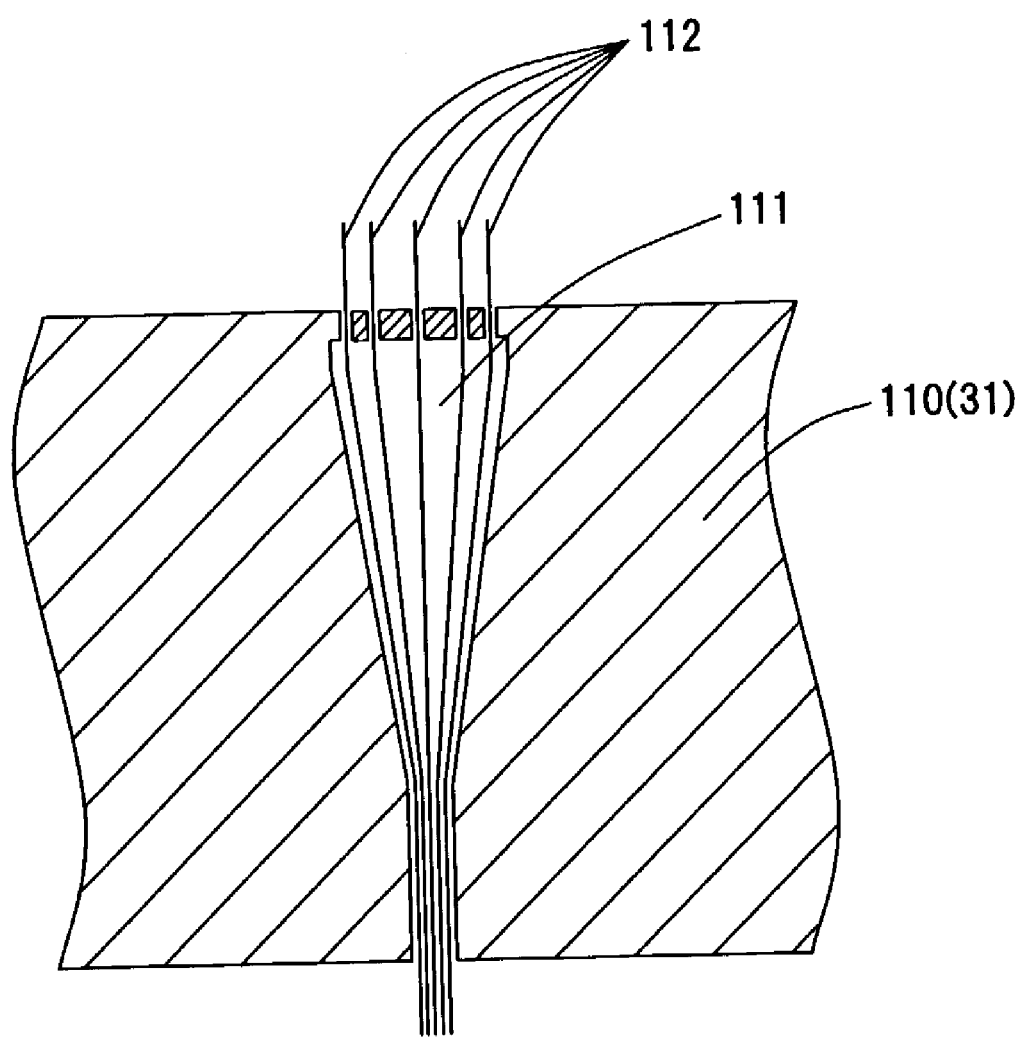
FIG. 5 shows a schematic drawing provided for describing an example of a current introduction terminal for feeding a small electric current to the water feed pump and level meter.

FIG. 5 shows a schematic drawing provided for describing an example of a current introduction terminal for feeding a small electric current to the water feed pump 32 and level meter 33 constituting the system for generating high pressure hydrogen according to the invention. In the drawing, the reference numeral 110 denotes a vessel wall of the electrolysis pure water tank 31, the reference numeral 111 denotes an insulator stuffed with a resin such as a curable epoxy resin, and the reference numeral 112 denotes a copper wire covered with an enamel coating. This construction permits a number of electric wires to be introduced into the electrolysis pure water tank 31.

Figure 6:
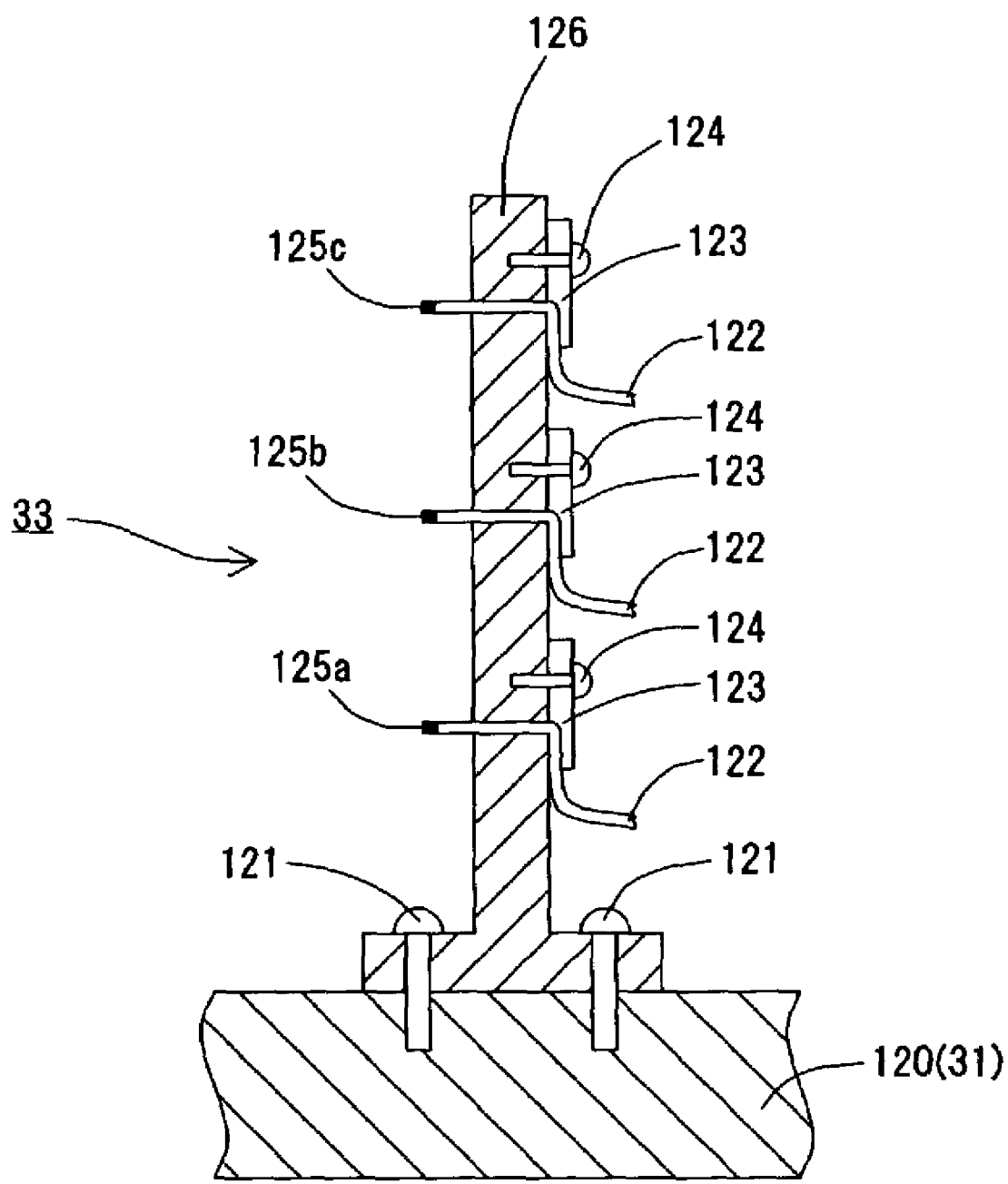
FIG. 6 shows a schematic drawing provided for describing an example of the level meter.

FIG. 6 shows a schematic drawing provided for describing an example of the level meter used in the invention. In the drawing, the reference numeral 120 denotes the vessel wall of the electrolysis pure water tank 31, the reference numerals 121 and 124 denote fixing screws, the reference numeral 122 denotes a copper wire covered with an enamel coating, the reference numeral 123 denotes a press board, the reference numerals 125a to 125c denote electrodes plated with gold after pealing off the enamel coating, and the reference numeral 126 denotes a brace. Since the electrical resistance between the vessel wall 120 and electrode 125a of the level meter 33 so constructed as described above differs when the electrode 125a is submerged and not submerged in pure water, the electrode 125a submerged in pure water can be discriminated from the electrode 125a not submerged in pure water, enabling it to be determined whether the electrode 125a is above the water surface or under the water surface.

Accordingly, it can be determined whether the water surface 33a is between the electrodes 125a and 125b, between the electrodes 125b and 125c, or above the electrode 125c, enabling the set of electrodes to serve as a level meter.

Figure 7:
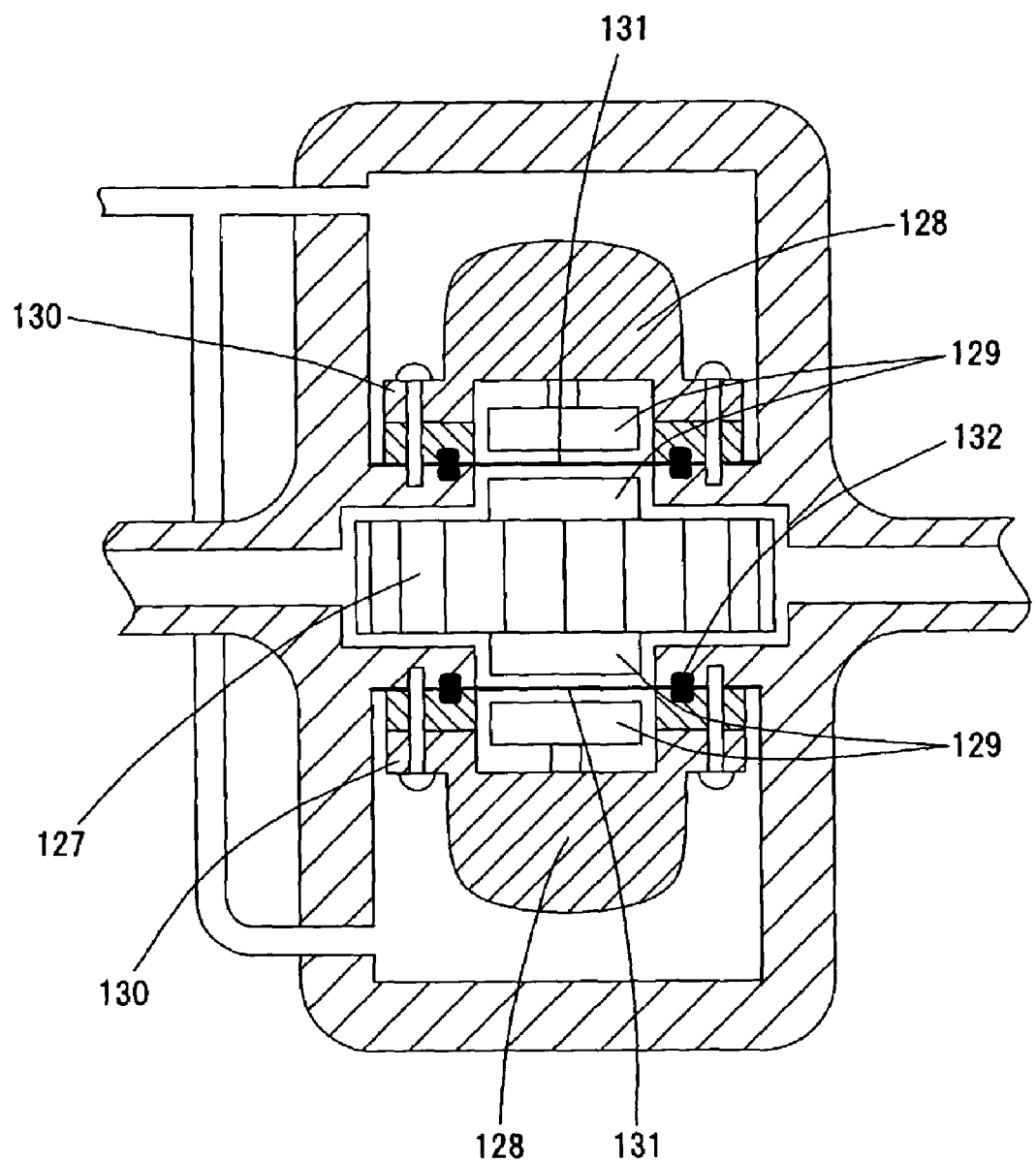
FIG. 7 shows a schematic drawing provided for describing another example of the water feed pump.

FIG. 7 shows an example of an external water feed pump powered by electricity provided at the outside of the electrolysis pure water tank 31, which is different from the water feed pump 32 placed in the electrolysis pure water tank 31. A pair of motors 128 and a pair of magnets 129 is symmetrically disposed relative to a water feed rotation blade 127. The pump main unit and rotation blade 127, and ring plate 130 are made of a non-magnetic material such as stainless steel, and the space between the magnet 129 fixed on the rotation blade 127 and the magnet 129 fixed on the axis of the motor 128 are separated with a thin partition wall 131 made of a heat-resistive plastic, such as a poly(ether-ether-ketone) resin (PEEK).

The magnet 129 of the rotation blade 127 attracts the magnet 129 at the motor 128 side by employing the construction as described above, and the rotation blade 127 floats and is fixed in the space.

The blade 127 rotates with rotation of the motor 128. Pure water flows into bottom of the electrolysis pure water tank 31 connected to the rotation blade 127 side, while oxygen flows into the upper part of the electrolysis pure water tank 31 connected to the motor 128 side. However, these portions have the same pressure since they are in the same electrolysis pure water tank, and no differential pressure is applied to the partition plate 131.

While pure water in the electrolysis pure water tank 31 is sent into the anode side of the electrolysis cell 1, the electric current is supplied to the motor 128 through electric wires penetrating through the main unit of the water feed pump via current introduction terminals as shown in FIG. 4.

Figure 8:
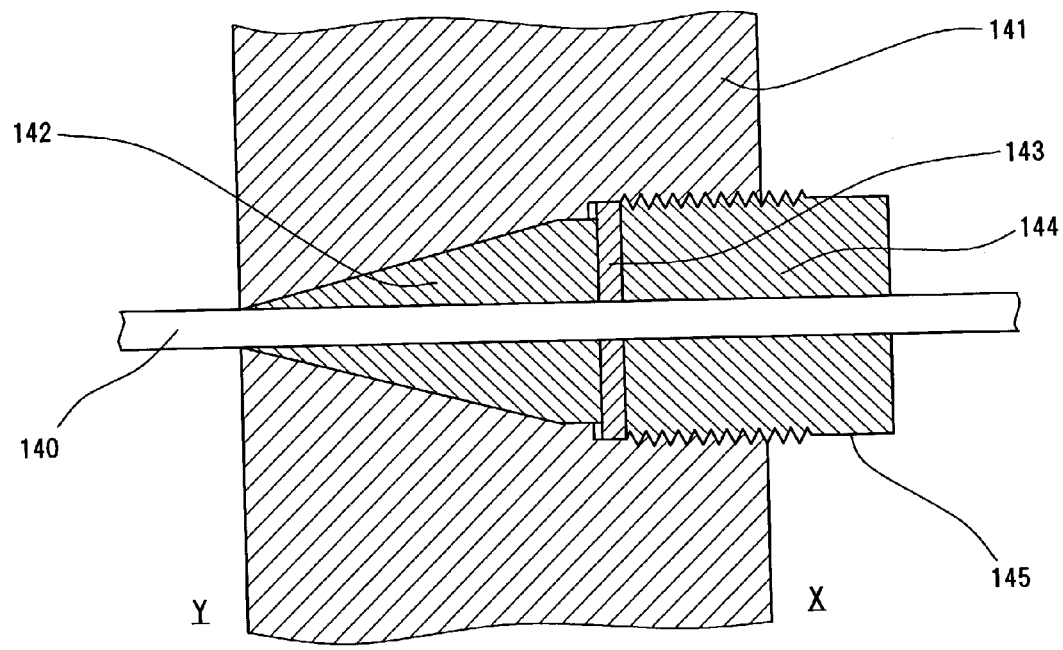
FIG. 8 shows a schematic drawing provided for describing an example of the method for sealing the through-hole formed at the side wall of the high pressure vessel.

FIG. 8 shows a schematic drawing provided for describing an example of the method for sealing the through-hole formed at the side wall of the high pressure vessel 10 or pure water and oxygen vessel 31. In the drawing, the reference numeral 141 denotes the side wall of the high pressure vessel 1 or pure water and oxygen vessel 31, X denotes the inside of the vessel while Y denotes the outside of the vessel, the reference numeral 140 denote a piping, the reference numeral 142 denotes a core, the reference numeral 143 denotes a ring, the reference numeral 144 denotes a fixing screw, and the reference numeral 145 denotes a holder of the fixing screw.

The construction as described above permits the core 142 to be pressed onto the side wall 141 to fit the piping 140 by compression when the fixing screw 144 is tightened from the X-direction by holding the holder 145 of the fixing screw. The core 142 is tightened by pressing the fixing screw 144 by the high pressure in the vessel to the direction for tightening, and the pipe line is completely sealed in the through-hole.

While the core 142 is molded into a structure by which it is fixed by being inserted into the side wall 141 in the description of FIG. 8, a commercially available connector may be fixed in the through-hole of the side wall 141 using a tapered screw, and the pipe line 140 may be sealed with the same core 142 as described in FIG. 8.

Figure 9:
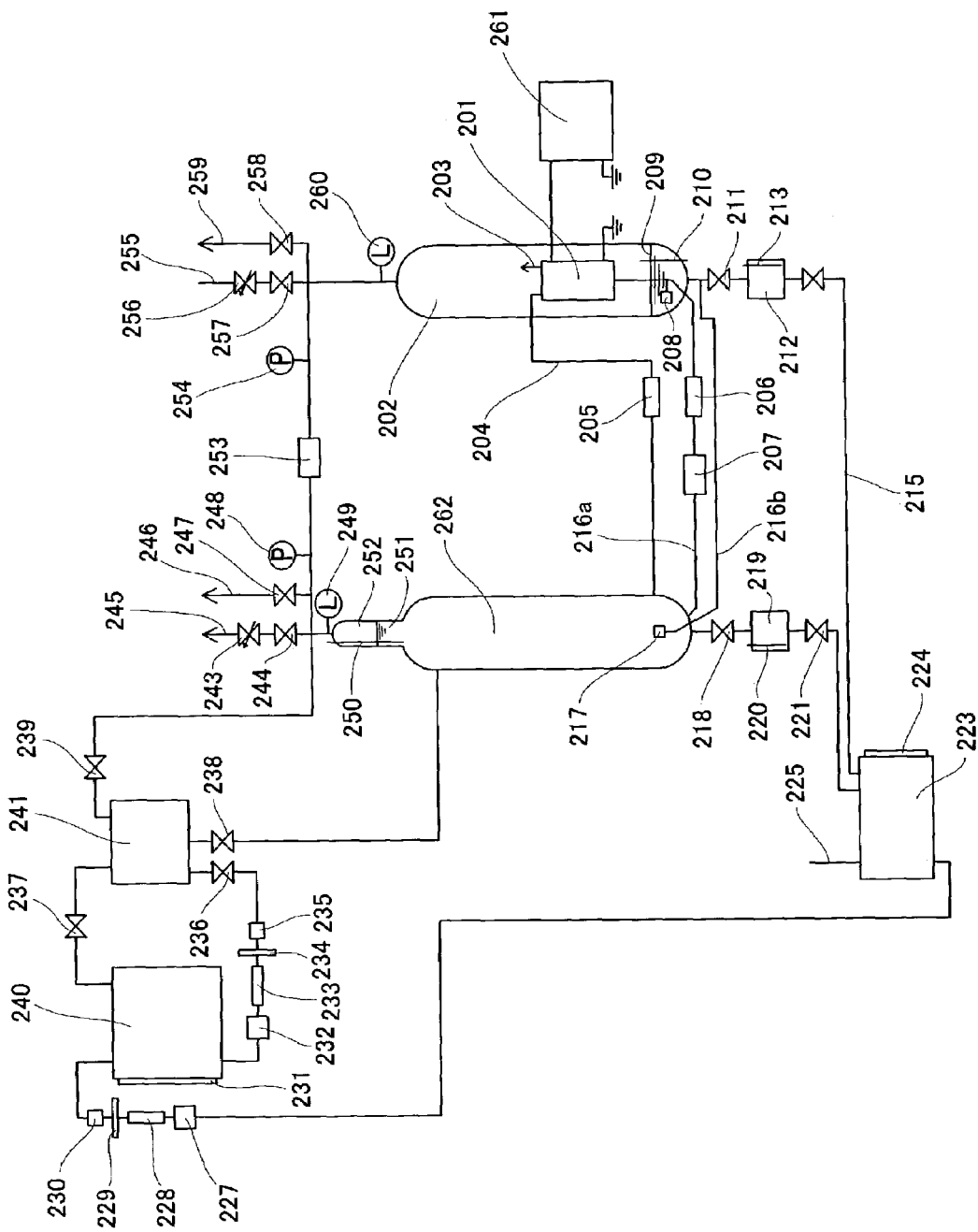
FIG. 9 is a schematic diagram showing the overall constitution of another example of the system for generating high pressure hydrogen according to the invention.

FIG. 9 is a schematic diagram showing the overall constitution of another example of the system for generating high pressure hydrogen according to the invention. This system for generating high pressure hydrogen is basically the same as that shown in FIG. 1, and comprises a high pressure hydrogen vessel 202 constructed so that an electrolysis cell 201 is accommodated in a hydrogen atmosphere generated, a high pressure oxygen vessel 262 for storing returned pure water and oxygen generated, pure water pipes lines 216a and 216b through which pure water in the high pressure hydrogen vessel 202 communicates with pure water in the high pressure oxygen vessel 262, and a differential pressure sensor 253 for sensing the differential pressure between the pressure of hydrogen in the high pressure hydrogen vessel 202 and the pressure of oxygen in the high pressure oxygen vessel 262 in order to control the differential pressure.

In the system for generating high pressure hydrogen shown in FIG. 9, pure water to be electrolyzed is sent into the electrolysis cell 201 from the high pressure oxygen vessel 262 with the pump 207, and pure water is electrolyzed by feeding electric power required for electrolysis from a power source 261. Hydrogen and pure water are discharged into the high pressure hydrogen vessel 202 from a hydrogen discharge port 203, oxygen generated and pure water not electrolyzed are sent into the high pressure oxygen vessel 262 through a return pipe line 204, and oxygen is stored in the oxygen pool 252 located at the upper part of the high pressure oxygen vessel 262.

The pressures in the high pressure hydrogen vessel 202 and high pressure oxygen vessel 262 are increased by the hydrogen and oxygen generated, respectively, to a prescribed pressure of, for example, 400 atm. The system is in waiting at this pressure by halting electrolysis when no hydrogen is needed. When hydrogen is needed, on the other hand, a valve 257 is opened and a needle valve 256 is slowly opened to feed hydrogen from a hydrogen feed port 255.

When a decrease of the pressure in the high pressure hydrogen vessel 202 is sensed with a pressure gauge 254 after feeding hydrogen, the feed of electric power to the electrolysis cell 201 from the power source 261 is resumed by the instruction of a controller (not shown) operating in cooperation with the pressure gauge 254, and electric power is supplied until the pressure measured by the pressure gauge 254 returns to its original value.

The aperture of the needle valve 256 is further increased when the pressure as measured with the pressure gauge 254 resumes with an increase of electric power from the power source 261 until the pressure as measured by the pressure gauge 254 resumes its original value. Feed of hydrogen continues by maintaining the aperture of the needle valve and the electric power from the power source, until the pressure does not decrease by increasing the aperture of the needle valve, or the electric power supplied from the power source 261 reaches a maximum allowable power.

The differential pressure between the pressure of oxygen stored in an oxygen pool 252 and the pressure of hydrogen in the high pressure hydrogen vessel 202 is measured with a differential pressure sensor 253, an example of which is shown in the embodiment below, during electrolysis and feed of hydrogen. Usually, the controller (not shown) controls switching of the valve 244 and the aperture of the needle valve 243. The amount of discharged oxygen from an oxygen discharge port 245 is controlled so that no differential pressure signal is emitted from the differential pressure sensor 253.

Pure water is electrolyzed while controlling the pressure in the high pressure hydrogen vessel 202 to be equal to the pressure in the pure water and high pressure oxygen vessel 262, and hydrogen is supplied from the hydrogen feed port 255.

The differential pressure between the high pressure oxygen vessel 262 and high pressure hydrogen vessel 202 is controlled by the discharge of oxygen and hydrogen, particularly by the discharge of oxygen in the system for generating high pressure hydrogen shown in FIG. 1. However, since the allowable pressure expected from the pressure resistance of the electrolysis cell 201 is usually about 4 atm, a pressure control with an accuracy of, for example, as high as 1% or more is required for generating hydrogen and oxygen with a pressure of 400 atm or more using the electrolysis cell 201.

A differential pressure exceeding the allowable pressure resistance of the electrolysis cell 201 may be generated by a disturbance of the pressure control caused by a variation of the amount of consumed hydrogen by the system connected to the hydrogen feed port 255 for feeding hydrogen to the system, or by a variation of the electric power supplied from the power source 261. Accordingly, switching valves 208 and 217 are provided in this system, in order to avoid a differential pressure exceeding the allowable pressure resistance of the electrolysis cell. These switching valves are connected to the pure water pipe lines 216a and 216b, respectively, for communicating pure water in the high pressure hydrogen vessel 202 with pure water in the high pressure oxygen vessel 262, and are operated based on the differential pressure.

Accordingly, pure water in the high pressure oxygen vessel 262 is discharged into the high pressure hydrogen vessel 202 through the switching valve 208, when the pressure of hydrogen in the high pressure hydrogen vessel 202 is reduced below the pressure of oxygen in the high pressure oxygen vessel 262, and when the differential pressure between them might exceed the allowable pressure of the cell 201. Consequently, the volume of pure water in the high pressure oxygen vessel 262 is reduced while the volume of oxygen in the oxygen pool 252 is increased, thereby reducing the pressure in the high pressure oxygen vessel 262 while increasing the pressure in the high pressure hydrogen vessel 202 to maintain a differential pressure below the allowable pressure resistance.

Suppose that the volume of hydrogen in the high pressure hydrogen vessel 202 is 20 L, the volume of oxygen in the high pressure oxygen vessel 262 is 0.4 L (2% of the volume of hydrogen), and the pressure of hydrogen generated is 400 atm. Then, 4 cc of pure water, as 1% of 0.4 L of oxygen, flows out of the high pressure oxygen vessel 262 and flows into the high pressure hydrogen vessel 202. Consequently, the pressure of oxygen reduces to 4 atm, as 1% of 400 atm, and the pressure of hydrogen increases to 0.08 atm. Accordingly, a differential pressure of 4.08 atm can be efficiently reduced to below the pressure resistance of the cell by transfer of water with a volume of only 4 cc.

Controlling the water surface 251 in the high pressure oxygen vessel 262 is crucial for generating hydrogen particularly at a pressure of 350 atm or more. In this invention, the level meter 250 is disposed in the high pressure oxygen vessel 262 to always monitor the water surface 251, and pure water in the high pressure pure water feed tank 241 is allowed to flow into the high pressure oxygen vessel 262 by taking advantage of gravity by opening the valve 238 when the water surface 251 descends from a prescribed level. Flowing pure water into the high pressure oxygen vessel 262 from the high pressure pure water feed tank 241 permits the same volume of oxygen to flow into the high pressure pure water feed tank 241 through the valve 239.

It is crucial to place the high pressure pure water feed tank 241 at a higher level than the high pressure oxygen vessel 262, and the pure water feed tank 240 for replenishing pure water into the high pressure pure water feed tank 241 at the same or higher level than the high pressure pure water feed tank 241, in order to flow pure water in the high pressure pure water feed tank 241 into the high pressure oxygen vessel 262 by taking advantage of gravity.

Pure water is replenished into the high pressure pure water feed tank 241 by closing the valves 238 and 239, and by opening the valves 236 and 237. The high pressure oxygen vessel 262 is isolated by closing the valves 238 and 239, and pure water in the pure water replenishing tank 240 is sent into the high pressure pure water feed vessel with a pump 232 through an ion-exchanger tower 233 and filter 234.

The resistivity of pure water is measured with a resistivity meter 235. Pure water is circulated through the ion-exchanger tower 233 for ion-exchange treatment until the resistivity becomes higher than the prescribed value, since the catalyst electrode of the electrolysis cell 201 is poisoned and the service life of the electrolysis cell 201 is shortened when the resistivity of pure water is too low.

The inside of the high pressure pure water feed tank 241 is filled with pure water while enabling air bubbles to be removed, when the pure water replenishing tank 240 is placed above the high pressure pure water feed tank 241. Accordingly, the pressure variation when the valves 236 and 237 are closed and the valves 238 and 239 are open only depends on the volume changes of pure water, which may be substantially ignored.

Since pure water is circulated with the pump 232 at the atmospheric pressure, the pump 232, ion-exchanger tower 233, filter 234 and resistivity meter 235 are all operated at the atmospheric pressure.

Circulation of pure water with the pump 232 is terminated depending on the resistivity of pure water measured by the resistivity meter 235.

When a subsidiary tank having the same performance as the high pressure pure water feed tank 241 is provided, the feed of pure water in the high pressure oxygen tank 262 is never delayed by allowing any one of them to be always ready.

Pure water in the high pressure oxygen vessel 262 serves as a material of electrolysis by being sent into the electrolysis cell 201. Accordingly, when pure water stays for a long period of time and water quality is decreased with a resistivity of, for example, 6 M $\Omega/cm^2$ or less, the catalyst electrode of the electrolysis cell 201 may be poisoned and the service life of the electrolysis cell 201 may be shortened. Accordingly, it is desirable to occasionally replace a part of pure water with fresh pure water in order to prevent the quality of pure water in the high pressure oxygen vessel 262 from being deteriorated.

Pure water in the high pressure oxygen vessel 262 is exchanged by allowing pure water in the high pressure oxygen vessel 262 to flow into a pure water discharge tank 219 by opening the valve 218, discharging pure water in the pure water discharge tank 219 into a water reservoir 223 by closing the valve 218 and opening the valve 221, and replenishing fresh pure water with a volume corresponding to the volume of discharged water form the high pure water feed tank 241.

For reducing the pressure variation in the pure water exchange work, the volume of the pure water discharge tank 219 is preferably about 1% of the volume of the oxygen pool 252, and the frequency of exchange of pure water may be about 10 times per day (about 10%), although it depends on the amount of pure water used.

Pure water permeated into the cathode from the anode of the electrolysis cell 201 is discharged with the generated hydrogen from the hydrogen discharge port 203 into the high pressure hydrogen vessel 202, and pure water is collected at the bottom in the high pressure hydrogen vessel 202.

The storage volume of the pure water is preferably about twice of the volume of the oxygen pool 252 of the high pressure oxygen vessel 262. The volume is controlled by sensing the water surface 209 with the level meter 210, and pure water is allowed to flow into the pure water reservoir 212 by opening the valve 211 when the volume of pure water has increased to above the prescribed volume. The volume of the pure water reservoir 212 is determined so that the pressure variation caused by opening the valve 211 and allowing pure water to flow into the pure water reservoir 212 does not exceed the allowable pressure resistance determined by the pressure resistance of the electrolysis cell 201.

For example, suppose that the maximum pressure of generated hydrogen in the high pressure hydrogen vessel 202 is 400 atm, the volume of stored hydrogen is 20 liters, and the allowable pressure of the electrolysis cell 201 is 4 atm, the pressure variation of hydrogen in the operation to allow pure water to flow into the pure water reservoir 212 by opening the valve 211 is calculated to be 400 atm×0.01=4 atm, with the proviso that the volume of the pure water reservoir is 0.2 liters (1% of the volume of the stored hydrogen).

Even when a differential pressure of more than 4 atm is generated by accumulation of some factors, no differential pressure exceeding the allowable value of the pressure resistance of the electrolysis cell is generated by the action of the switching valves 208 and 217.

In FIG. 9, the reference numeral 205 denotes a heat exchanger for cooling the heat generated by electrolysis, the reference numeral 206 denotes a heat exchanger for adjusting pure water supplied to the electrolysis cell 201 to a desired temperature, the reference numeral 213 denotes an electrical resistance type level meter, the reference numeral 215 denotes a pure water discharge pipe line, the reference numeral 220 denotes an electrical resistance type level meter, the reference numeral 224 denotes a float type level meter, the reference numeral 225 denotes a water feed port, the reference numeral 227 denotes a pump, the reference numeral 228 denotes an ion-exchanger tower, the reference numeral 229 denotes a filter, the reference numeral 230 denotes a pure water resistivity meter, the reference numeral 231 denotes a float type level meter, the reference numeral 246 denotes an emergency oxygen discharge port, the reference numeral 247 denotes an emergency oxygen discharge port, the reference numeral 248 denotes a pressure gauge, the reference numeral 249 denotes a gas leak sensor for sensing the concentration of hydrogen in oxygen, the reference numeral 258 denotes an emergency hydrogen discharge valve, the reference numeral 259 denotes an emergency hydrogen discharge port, and the reference numeral 260 denotes a gas leak sensor for sensing the concentration of oxygen in hydrogen.

Figure 10:
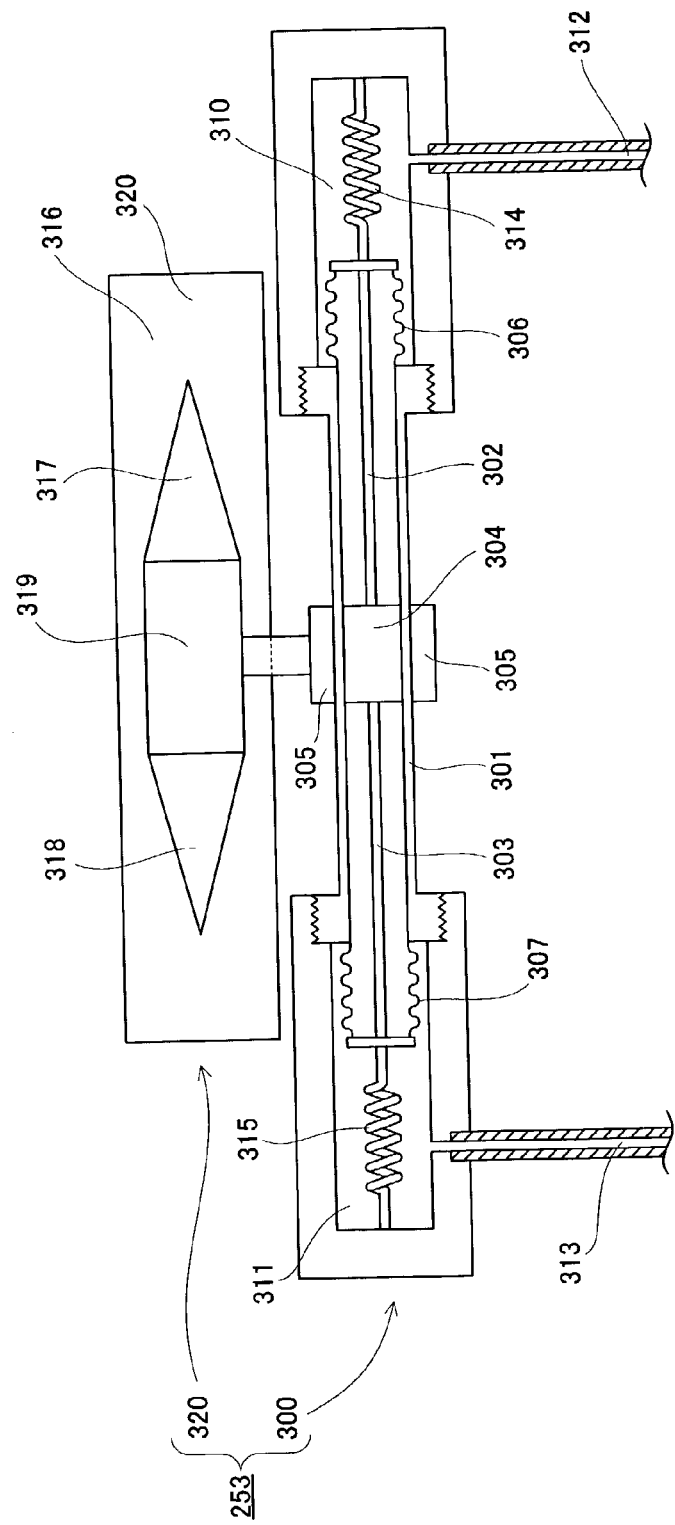
FIG. 10 is a partial cross section showing the structure of the differential pressure sensor in FIG. 9.

FIG. 10 is a partial cross section showing the structure of the differential pressure sensor used in the invention. As shown in the drawing, the differential pressure sensor 253 comprises a main unit 300 which has a cylinder 301 whose both ends are sealed with bellows 306 and 307 expandable in the longitudinal direction by the pressure of the high pressure hydrogen vessel 202 or high pressure oxygen vessel 262 and filled with an inert fluid therein; an internal magnetic body 304 provided to be freely slidable in an axial direction in close contact with the inner face of the cylinder 301; an external magnetic body 305 in close contact with the outer surface of the cylinder 301 to move in cooperation with the internal magnetic body 304 so as to be slidable; and a sensor 320 for sensing the differential pressure in cooperation with an external magnetic body 305 slidable by expansion of the bellows 306 and 307.

The sensor 320 comprises a light shielding plate 319 movable in cooperation with the external magnetic body 305; a display plate 316 comprising openings 317 and 318 shielded by the light shielding plate 319; and a photoelectric meter (not shown) for converting the transmission luminous energy of the light, after permeating through the openings 317 and 318, into electrical signals.

In the differential pressure sensor 253 shown in FIG. 10, hydrogen in the high pressure hydrogen vessel 202 is sent into a hydrogen pressure compartment 310 through a hydrogen pipe line 312, and oxygen in the high pressure oxygen vessel 262 is sent into an oxygen pressure compartment 311 through an oxygen pipe line, and the pressures in these compartments are transferred to the bellows 306 and 307, respectively.

Since a fluid such as a machine oil is filled in the bellows 306 and 307, and in the cylinder 301, the volume thereof substantially shows no change with the pressures. Accordingly, the bellows 306 and 307 are not crushed under the high pressure of oxygen and hydrogen sent from the hydrogen pipe line 312 and oxygen pipe line 313.

When the pressure of hydrogen sent from the hydrogen pipe line 312 is equal to the pressure of oxygen sent from the oxygen pipe line 313, the internal magnetic body 304 remains stopped at the center of the cylinder 301, since the forces applied to the bellows 306 and 307 from the hydrogen pressure compartment 310 and oxygen pressure compartment 311, respectively, are equal.

However, when the pressure of hydrogen sent from the hydrogen pipe line 312 is higher than the pressure of oxygen sent from the oxygen pipe line 313, a spring 314 expands while a spring 315 contracts by the differential pressure, and the internal magnetic body 305 displaces to the oxygen pressure compartment 311 side by being pushed by fixing bars 302 and 303 to a position where the differential pressure balanced with the force by expansion and contraction of the springs 314 and 315, respectively.

Since the internal magnetic body 304 and external magnetic body 305 are magnetically coupled by the magnetic force applied between them, the external magnetic body 305 displaces in response to the displacement of the internal magnetic body 304 with the displacement of the light shielding plate 319 fixed to the external magnetic body 305 to cover a part of the opening 318 at the oxygen side. Consequently, the luminous energy passing through the opening 318 is reduced while the luminous energy passing through the opening 317 remains unchanged.

When the pressure of hydrogen sent from the hydrogen pipe line 312 is lower than the pressure of oxygen sent from the oxygen pipe line 313, on the contrary, a part of the opening 317 at the hydrogen side is covered with the light shielding plate 319, and the luminous energy passing through the opening 317 decreases.

Which of the pressure of hydrogen sent from the hydrogen pipe line 312 and the pressure of oxygen sent from the oxygen pipe line 313 is higher, or the differential pressure between them, can be determined by measuring the luminous energy passing through the openings 317 and 318. Therefore, the differential pressure may be adjusted to zero by controlling the amount of discharged oxygen by controlling, for example, switching of the valve 244 and needle valve 243 shown in FIG. 9.

While the method for sensing the position of the internal magnetic body by measuring the luminous energy was explained in the description above, this measurement may be performed using a slide resistor. A slider is fixed to the external magnetic body 305, and the slider is made to slide on the slide resistor in harmony with the displacement of the slider integrated with the external magnetic body 305, thereby measuring the distance of displacement of the internal magnetic body 304.

Figure 11:
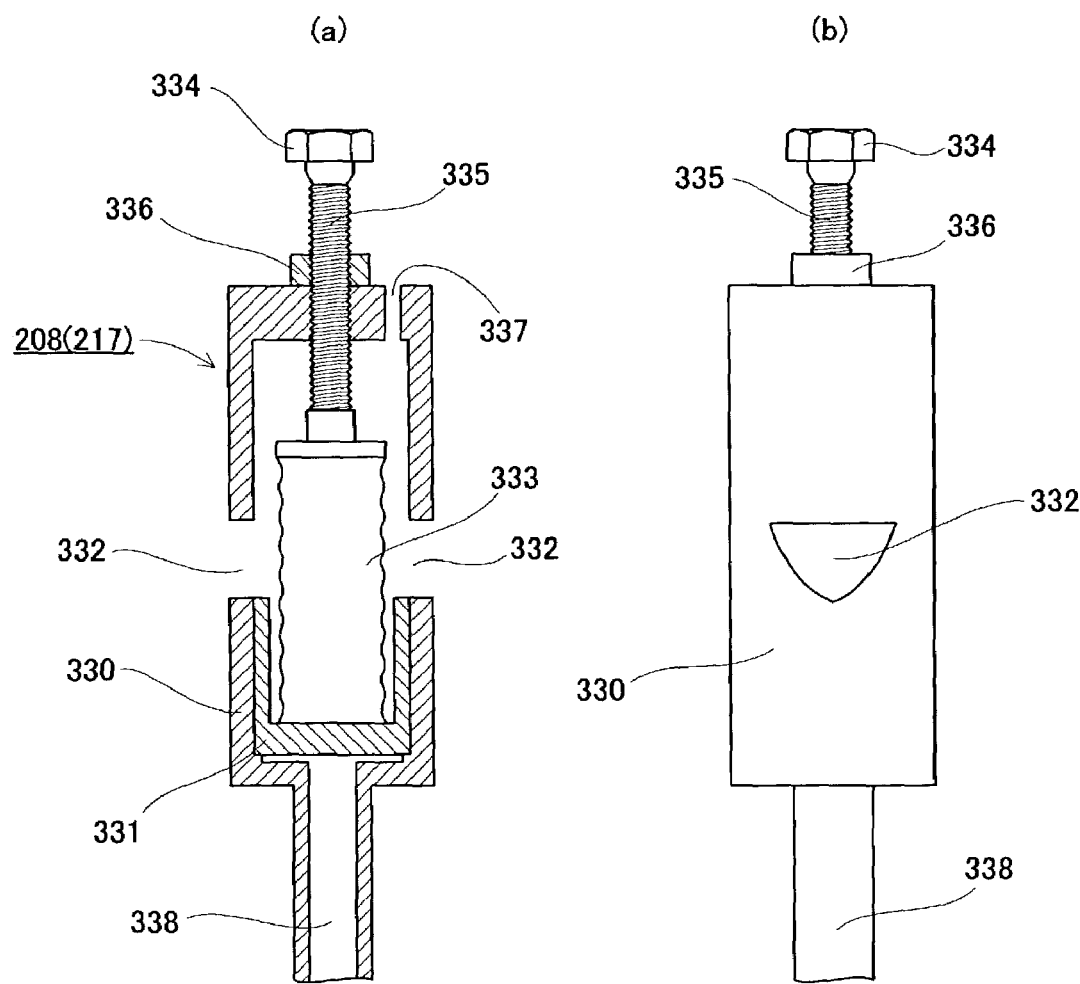
FIG. 11a is a cross section showing the structure of the release valve in FIG. 9.
FIG. 11b is a side view showing the structure of the release valve in FIG. 9.

FIGS. 11a and 11b are a cross section and side view, respectively, showing the structure of a release valve 208 or 217 used in the system. As shown in the drawing, the release valve 208 or 217 comprises a discharge port 332 provided at a cylindrical main unit of a valve 330; a cylinder 331 provided within the cylindrical valve; a spring 333 interlocked to the cylinder 331, the spring 333 being fixed with a screw 335 and a fixing nut 336 so as to be able to adjust the spring force; a connection pipe line 338 to a pure water pipe line 216a or 216b for allowing pure water in the high pressure hydrogen vessel 202 or high pressure oxygen vessel 262 to transfer; and a ventilation port 337.

The release valve 208 and 217 are provided so as to adjust the pressing strength of the spring 333 by loosening the fixing nut 336 and turning a screw head 334. Consequently, the cylinder 331 pushed up by the pressure of pure water transferred through the connection pipe line 338 is located above the discharge port 332, and enables pure water in the connection pipe line 338 to be discharged from the discharge port 332 with a desired pressure (a pressure determined by the allowable pressure of the cell). It is also possible to tighten the fixing nut 336 so that the setting is not changed.

The cylinder 331 starts to displace upward by the contraction of the spring 333 due to a differential pressure applied when the pressure in the atmosphere accommodating the main unit 330 of the valve becomes higher than the pressure of pure water in the connection pipe line 338. When the pressure of pure water in the connection pipe line 338 is further increased, the level of the cylinder 331 exceeds the level of the discharge port 332 to allow pure water in the connection pipe line 338 to be discharged from the discharge port 332 to consequently reduce the pressure in the connection pipe line 338. When the discharge port 332 is formed into an inverse triangle, the amount of pure water discharged is reduced when the differential pressure is large while it is increased when the differential pressure is small, serving to promptly alleviate the differential pressure.

Figure 12:
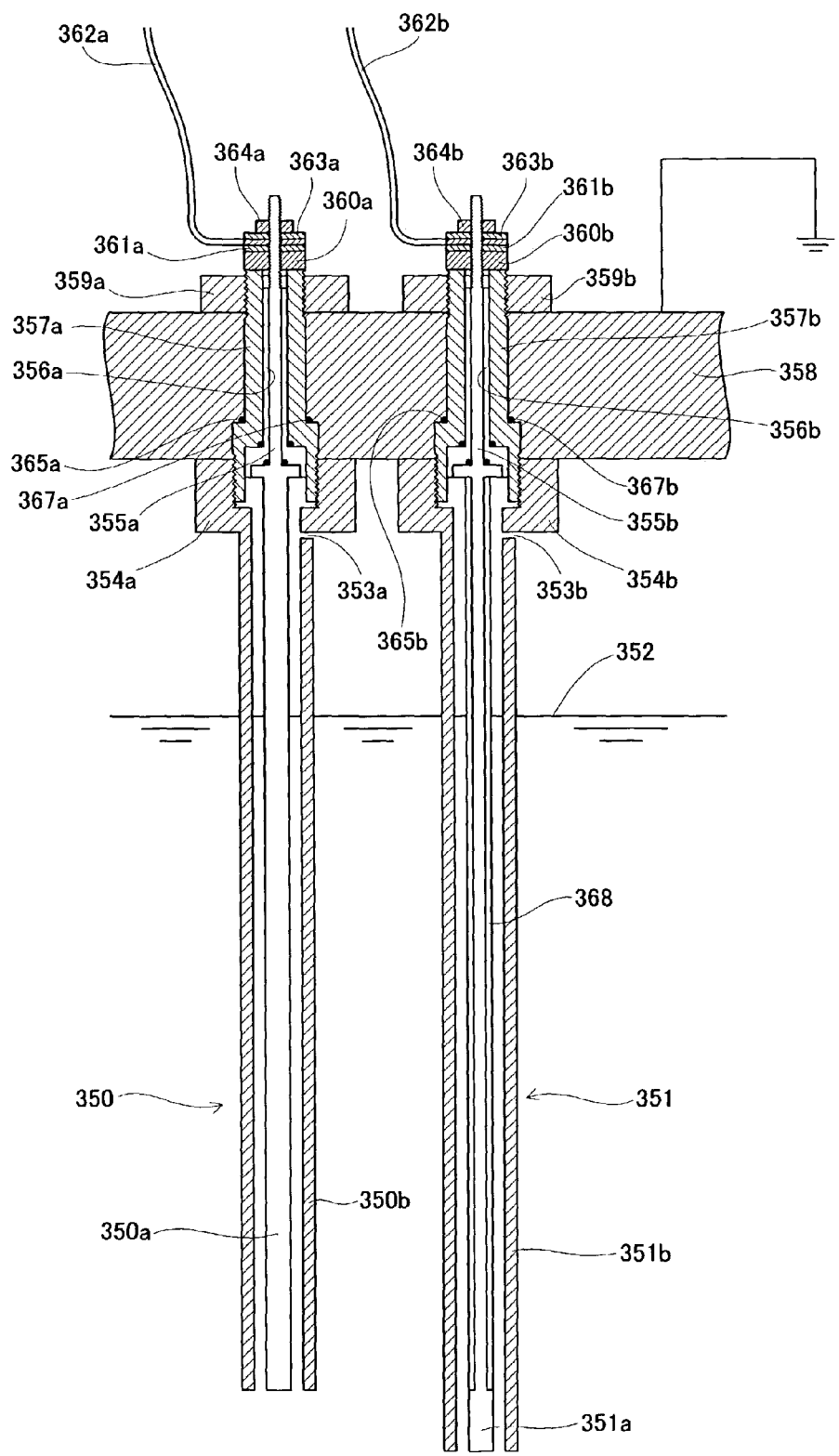
FIG. 12 is a cross section showing the structure of the level meter in FIG. 9.

FIG. 12 is a cross section of the level meter taking advantage of a large difference of electrical conductivity between a gas such as oxygen and pure water. The level meter is used as the level meter 250 in FIG. 9. The level meter comprises a main electrode 350 having a rod-shaped central electrode 350a and a concentric external electrode 350b disposed at the outside of the central electrode 350a; and a sub-electrode 351 having the rod-shaped central electrode 351a covered with an insulating cylinder except the tip of the electrode and a concentric external electrode 351b disposed at the outside of the central electrode 351a.

In the drawing, the reference numeral 352 denotes the surface of pure water; the reference numerals 353a and 353b denote ventilation holes; the reference numerals 354a and 345b denote attachment members of the external electrodes 350b and 351b, respectively; the reference numerals 355a and 355b denote attachment members of the central electrodes 350a and 350b, respectively; the reference numerals 356a and 356b denote insulators; the reference numerals 357a and 357b denote fixing jigs for attaching the external electrodes 350b and 351b, respectively; the reference numeral 358 denotes an attachment flange; the reference numerals 359a and 359b denote nuts for fixing the fixing jigs 357a and 357b, respectively; the reference numerals 360a and 360b denote insulating plates; the reference numerals 361a and 361b denote washers; the reference numerals 362a and 362b denote lead wires; the reference numerals 363a and 363b denote washers; the reference numerals 364a and 364b denote nuts for fixing the central electrodes 350a and 350b; and the reference numerals 365a to 367b denote o-rings.

When the central electrode 350a and external electrode 350b in the level meter 250 so constructed as described above are submerged into pure water, the resistance Rm of pure water filling between the central electrode 350a and external electrode 350b can be measured by connecting an electric resistance meter between the lead wire 362a and the ground.

The resistance Rr between the tip of the central electrode 350b exposed without being covered with the insulating cylinder 368 and the external electrode 351b can be measured by measuring the electrical resistance between the lead wire 362b and the ground.

The length of the tip portion of the central electrode 351a not covered with the insulating cylinder 368 is defined as Lr, and each length of the central electrode 350a and external electrode 350b submerged in pure water is defined as Lx. Then, Lx is determined by the following equation;

$$Lx = Lr(Rr/Rm) \quad (1)$$

The equation (1) above shows that the level of the surface of pure water 352 is determined by calculating Lx.

While the resistivity of pure water is about 18 M $\Omega/cm^2$ at the outlet of the ion-exchange resin tower, it decreases with time as the concentration of ions are increased by dissolving the wall of the pure water vessel. However, it is always possible to sense an accurate water level irrespective of the time dependent changes of resistivity of pure water, since the level is corrected by measuring Rr.

Since the gases such as hydrogen and oxygen are electric insulators, the electrical resistance between the lead wire 364a and the ground is determined only by the electrical resistance of pure water in which the central electrode 350a and external electrode 350b are dipped, and the effect of the electrical resistance of oxygen or hydrogen may be ignored.

Since all the materials as well as the central electrode 350a and external electrode 350b have excellent pressure resistance in structures and characteristics, the level meter 250 may be used without any pressure limitations as in the conventional float type level meter.

Although the materials of the electrode may be corroded by electrolysis when electricity is applied between the electrodes in an environment in which high pressure oxygen and hydrogen exist together, these problems can be avoided by pulse measurements or by plating the central electrodes 350a and 351a and external electrodes 350b and 351b with a precious metal, such as titanium or platinum, that is resistant to corrosion. Furthermore, since the electrical resistance Rr between the lead wire 364a and the ground is measured as the resistivity of pure water, the measured value can be used for evaluating the quality of pure water for determining the frequency of exchange of pure water in the high pressure vessel of pure water and oxygen 262.

Figure 13:
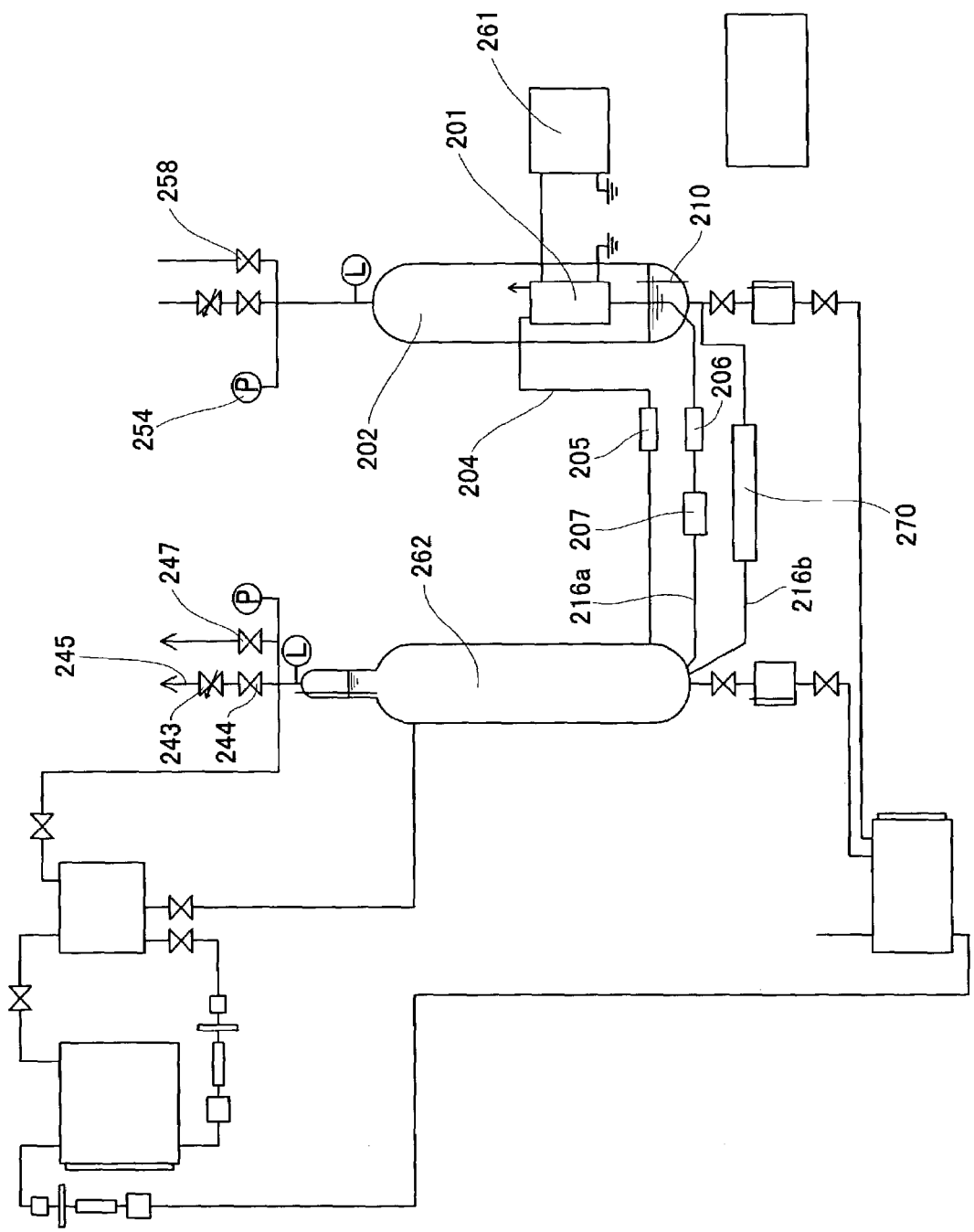
FIG. 13 is a schematic diagram showing the overall constitution of the third example of the system for generating high pressure hydrogen according to the invention.

FIG. 13 shows another example of the system for generating high pressure hydrogen according to the invention. The electrolysis cell 201 is designed to be accommodated in a hydrogen atmosphere generated in the high pressure hydrogen vessel 202, as in the system previously described. While the system also comprises the high pressure oxygen vessel 262 for storing pure water to be electrolyzed, returned pure water and oxygen generated, it also comprises a pressure controller 270 in place of the differential pressure sensor 253, and the discharge valves 208 and 217 are omitted therefrom.

The pressure controller 270 functions to alleviate the differential pressure by allowing pure water between the high pressure oxygen vessel 262 and high pressure hydrogen vessel 202 to move from the vessel having a higher pressure to the vessel having a lower pressure based on the differential pressure between them.

When the pressure in the high pressure oxygen vessel 262 becomes larger than the pressure in the high pressure hydrogen vessel 202, pure water in high pressure oxygen vessel 262 flows into the pressure controller 270, and the same volume of pure water is pushed back to the high pressure hydrogen vessel 202 from the pressure controller 270. Consequently, the pressure in the high pressure oxygen vessel 262 is reduced as the volume of pure water decreases with an increase of the volume of the oxygen pool 252, and the pressure in the high pressure hydrogen vessel 202 increases as the volume of pure water is increased, thereby alleviating the pressure differential.

The pressure controller 270 senses the transferred volume of pure water, and controls switching of the valve 244 and needle valve 243 with the controller (not shown). Consequently, pure water transferred to the high pressure hydrogen vessel 202 side returns to the high pressure oxygen vessel 262. Then, the volume of oxygen discharged from the oxygen discharge port 245 is controlled to prevent further transfer of pure water in order to even the pressure.

Since the method for controlling the amount of hydrogen generated from the hydrolysis cell 201 so that the pressure of hydrogen is maintained at a prescribed pressure by controlling the amount of electricity supplied from the power source 261 to the electrolysis cell 201, the method for replenishing pure water to and discharging pure water from the high pressure oxygen vessel 262, and the method for discharging pure water from the high pressure hydrogen vessel 202 are the same as those described in the system in FIG. 9, descriptions thereof are omitted.

Figure 14:
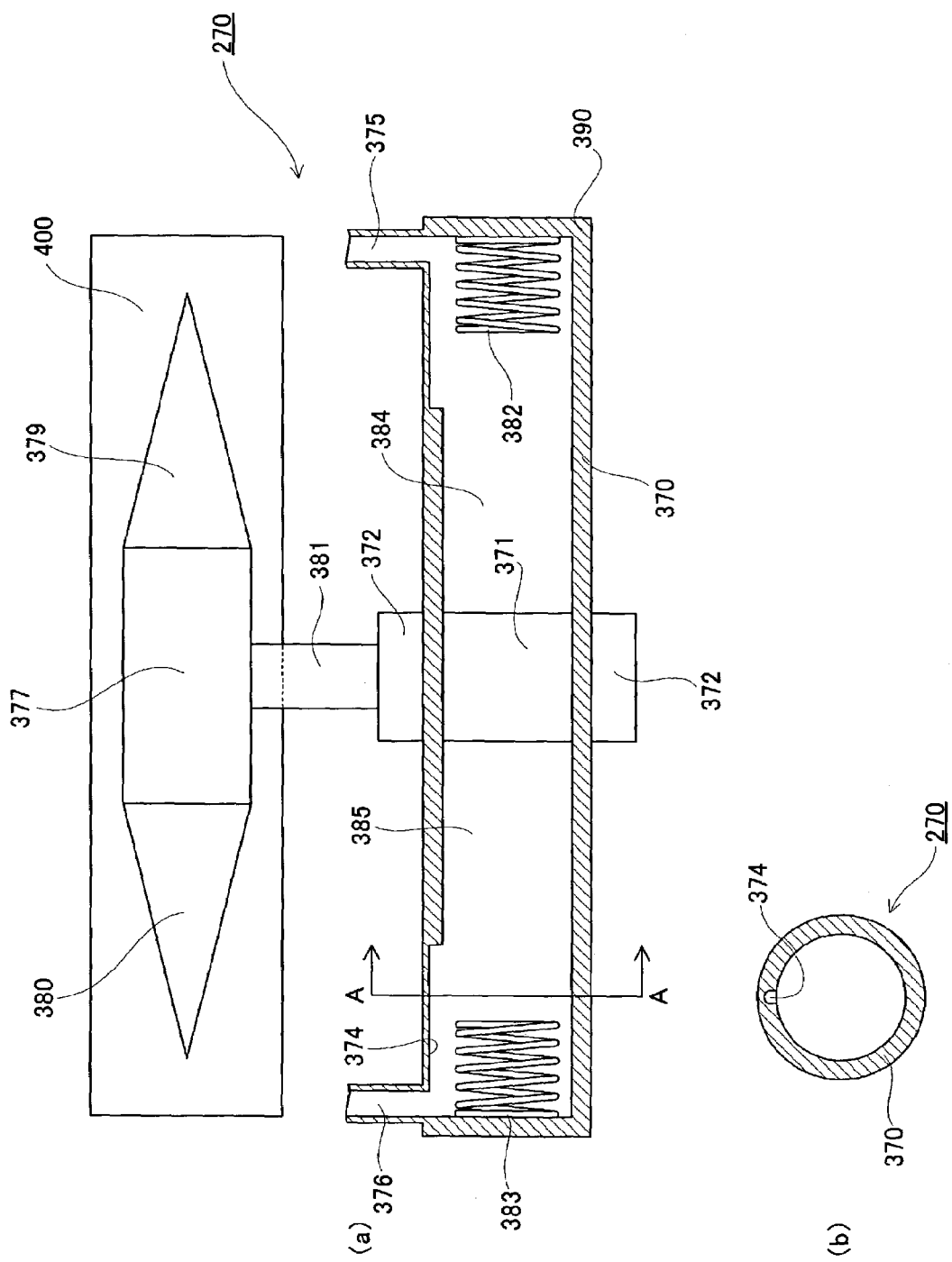

FIG. 14a shows a partial cross section of the pressure controller 270, and FIG. 14b shows a cross section of the pressure controller along the line A—A' in FIG. 14a. The pressure controller 270 comprises a main unit 390 of the pressure controller having a hollow cylinder 370 made of a non-magnetic material, an internal slider 371 sliding in close contact with the inner surface of the hollow cylinder 370 and made of a magnetic material, and an external slider 372 sliding in contact with the external surface of the hollow cylinder 370 and made of a magnetic material; and a positional sensor 400 for sensing the position of the external slider 372. Pure water 384 in the high pressure hydrogen vessel 202 is introduced into one half of the hollow cylinder 370 partitioned by the internal slider 371, and pure water 385 in the high pressure oxygen vessel 262 is introduced into the other half.

Pure water 384 in the high pressure hydrogen vessel 202 is isolated from pure water 385 in the high pressure oxygen vessel 262 by the internal slider 371. Accordingly, pure water 384 is never mixed with pure water 385. When the pressure in the high pressure hydrogen vessel 202 is equal to the pressure in the high pressure oxygen vessel 262 and no differential pressure is generated between the vessels, the internal slider 371 is set to position at the center of the hollow cylinder 370.

Accordingly, when the pressure in the high pressure oxygen vessel 202 becomes higher than the pressure in the high pressure oxygen vessel 262, pure water in the high pressure oxygen vessel 202 flows into the hollow cylinder 370 from the pipe line 375 to reduce the pressure in the high pressure oxygen vessel 202. Consequently, the internal slider 371 is pushed so as to increase the volume of pure water 384 by allowing pure water to flow into the hollow cylinder 370, and pure water 385 overflowing due to the reduced volume flows into the pure water and high pressure oxygen vessel 262 through the pipe line 376, thereby automatically alleviating the generated pressure differential since the pressure of oxygen is reduced due to the reduced volume of oxygen in the high pressure oxygen vessel 262.

The internal slider 371 moves to a position displaced to a spring 383 side from the center. Since the internal slider 371 is magnetically coupled with the external slider 372, the external slider 372 moves to the same position with the same displacement of a light shielding plate 377 that is fixed to the external slider 372 by a fixing bar 381 to cover a part of an opening 380, thereby reducing the luminous energy permeating through the opening 380.

Since the direction and length of displacement of the internal slider 371 are determined by comparing the luminous energy permeating through the opening 380 with the luminous energy permeating through the opening 379, the aperture of the needle valve 243 is controlled with the controller (not shown) so that the internal slider 371 returns to the original central position by comparing the transmission luminous energy of the opening 380 with the transmission luminous energy of the opening 379.

The positional sensor 400 for comparing the luminous energy of the pressure controller 270 has the same construction and function as those of the sensor 320 of the differential pressure sensor 253.

The volume of oxygen discharged from the oxygen discharge port 245 are controlled by controlling the aperture of the needle valve 243 so that the internal slider 371 always stays at the central position as described above. Therefore, high pressure hydrogen can be generated without applying a differential pressure to the electrolysis cell 201.

When the pressure in the high pressure hydrogen vessel 202 remains higher than the pressure in the high pressure oxygen vessel 262, and the displacement of the internal slider 371 cannot be stopped even after the control as described above, the internal slider 371 strikes the spring 383. Since the internal slider 371 cannot move any more without pressing the spring 371, no restriction is imposed on the movement of the internal slider 371 until the internal slider 371 comes to this position. Therefore, substantially no differential pressure is generated during this period.

However, when the internal slider 371 strikes the spring 383, the internal slider 371 cannot move any more unless it pushes the spring 383. In other words, the differential pressure cannot be controlled by the movement of the internal slider 371. However, when a by-pass flow passageway 374 is provided, the spring 383 contracts to permit pure water in the high pressure hydrogen vessel 202 to directly flow into the high pressure oxygen vessel 262 through the by-pass flow passageway 374, thereby preventing the pressure differential to increase above a prescribed pressure.

Permitting pure water in the high pressure hydrogen vessel 202 to directly flow into the high pressure oxygen vessel 262 through the by-pass flow passageway 374 indicates that some abnormal states have emerged making it impossible to control the operation of the system only by controlling the aperture of the needle valve 243 by the controller (not shown). Accordingly, an emergency shut-off switch (not shown) and emergency discharge valves 247 and 258 are provided for an emergency stop in these abnormal states, whereby the power source 261 of the electrolysis cell 201 is shut down while all the valves except the valve 258 are closed, and generation of hydrogen and oxygen from the hydrolysis cell 201 is halted in order to promptly decrease the pressure of the high pressure hydrogen vessel 202.

A nitrogen pipe line is also provided for purging the insides of the high pressure oxygen vessel 262 and high pressure hydrogen vessel 202 with nitrogen, in order to safely stop the system, although it is not illustrated in FIG. 13.

It is a countermeasure for protecting the electrolysis cell 201 from being broken by a pressure exceeding the pressure resistance to set the strength of the springs 382 and 383 so that the pressure differential for allowing pure water to flow into the by-pass flow passageways 373 or 374 as a result of pressing the spring 383 by the internal slider 371 to fall within the allowable pressure resistance of the electrolysis cell 201.

When the volume of the hollow cylinder 370, except the volume of the slider 371, is adjusted to be equal to the oxygen pool 252 in the high pressure vessel 262, ±50% of the pressure differential may be alleviated before operating the emergency shut-off mechanism.

Figure 15:
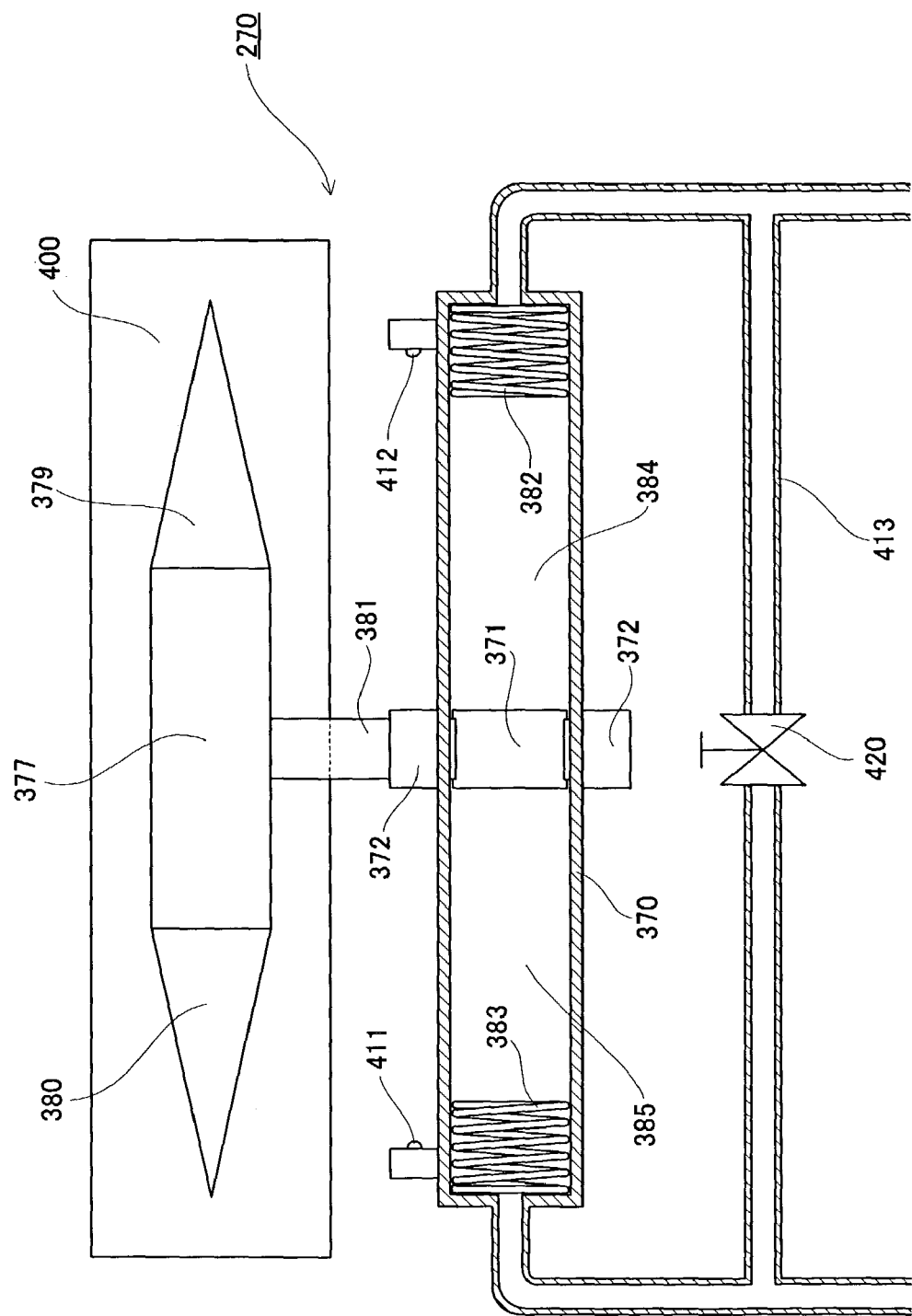
FIG. 15 shows a partial cross section of another example of the pressure controller.
Figure 16:
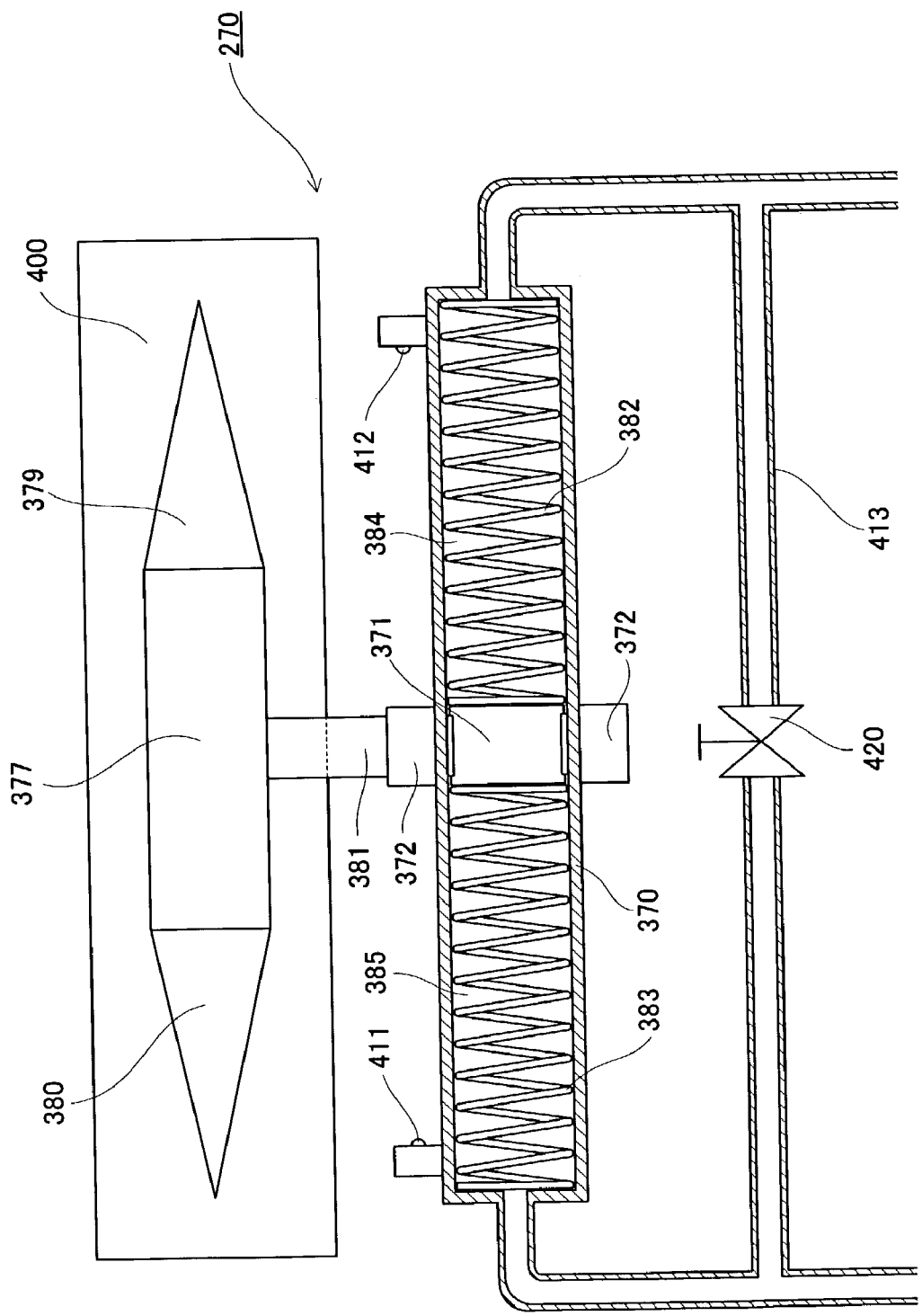
FIG. 16 shows a partial cross section of a different pressure controller.

FIGS. 15 and 16 show partial cross sections of different pressure controllers 270. The pressure controllers 270 shown in these drawings comprises a pure water pipe line 413 in parallel to the pressure controller 270 with an intermediate shut-off valve 420, and switches 411 and 412 for switching the valve.

In the pressure controller 270, the internal slider 371 permits the cut-off valve 420 to open by means of the switches 411 and 412 at both ends, when the differential pressure is increased beyond the controllable level by the displacement of the internal slider 371 and the internal slider 371 causes the spring 383 to contract. For example, pure water in the high pressure hydrogen vessel 202 is allowed to directly flow into the high pressure oxygen vessel 262 through the pure water pipe line 413 so that the differential pressure does not increase above a prescribed pressure.

Figure 17:
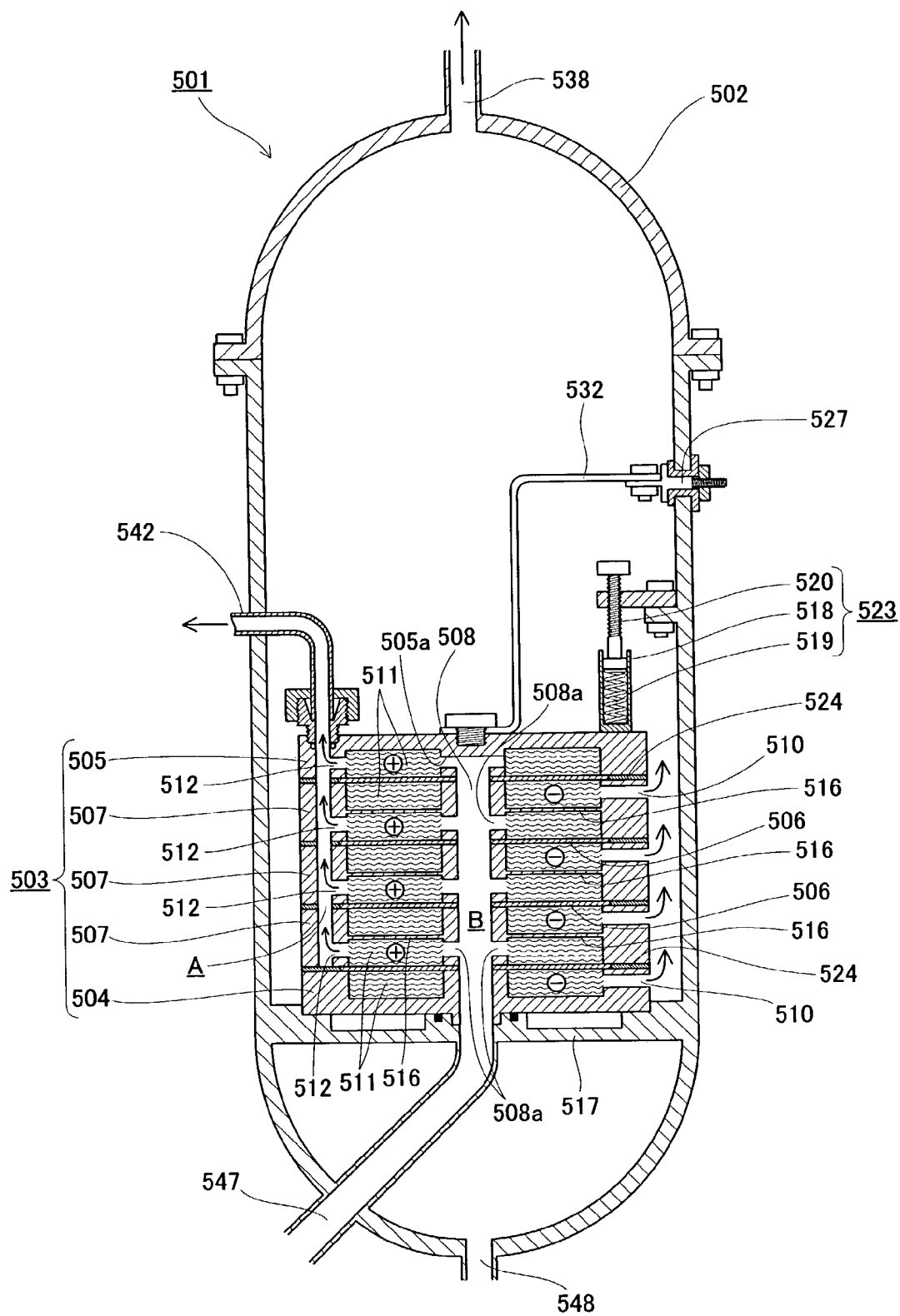
FIG. 17 is a cross section showing the structure and attachment of the electrolysis cell according to the invention.

FIG. 17 is a cross section showing the structure and attachment of the electrolysis cell used in the system 501 for generating high pressure hydrogen according to the invention.

The electrolysis cell 503, a double polarity multi-layered type electrolysis cell, is housed in the high pressure hydrogen vessel 502 in the vertical direction.

As is evident in FIG. 17, the electrolysis cell 503 comprises, between a disk-shaped main cathode 504 and main anode 505, a plurality of ring-shaped polyelectrolyte membranes 506 having platinum catalyst layers on both faces thereof, and a plurality of annular double polarity electrodes 507 made of a porous electrode 511 laminated with interposition of a division wall 516 between opposed porous electrodes 511 in the vertical direction. The electrolysis cell is mounted on a mounting table 517 provided in the high pressure hydrogen vessel 502, and the main anode 505 is compressed downward with a compression jig 523 compressed with a spring member 519.

The compression jig 523 comprises a cylindrical main unit 518 of the jig fixed on the electrolysis cell 503, a spring member 519 attached in the main unit 518 of the jig, and a press screw 520 having one end secured in the high pressure vessel 502 so as to energize the spring member 519. While one set of the compression jigs is shown in FIG. 17 for the convenience of illustration, a plurality of compression jigs are symmetrically arranged to evenly compress the electrolysis cell 503. However, the electrolysis cell 503 may also be compressed by hydraulic pressure.

The electrolysis cell 503 is formed by laminating a plurality of double polarity electrodes 507. A discharge passageway A of oxygen and pure water is provided by forming permeation holes 509 on the outer circumference of each double polarity electrode 507 so as to communicate the holes with each other in the vertical direction. Discharge ports 512 of oxygen and pure water are formed at the anode side of each double polarity electrode 507 to face the gas discharge passageway A, and oxygen generated and pure water not electrolyzed are discharged to the outside of the high pressure vessel 502 through the discharge port 512, oxygen and pure water discharge passageway A and oxygen discharge pipe line 542. A hydrogen and pure water discharge port 510 is formed, on the other hand, in the radial direction in order to directly discharge hydrogen generated from the cathode and permeating pure water into the high pressure vessel.

A pure water feed passageway B is formed at the center of the electrolysis cell 503 for feeding electrolysis pure water through permeation holes 508, which are formed at the center of each double polarity electrode 507 so as to communicate with each other in the vertical direction. This pure water feed passageway B is connected to a pure water feed pipe line 547 for feeding pure water from the outside of the high pressure vessel 502, and pure water is supplied to the porous electrode 511 through pure water feed ports 508a formed at the anode side in contact with the pure water feed passageway B.

A lead wire 532 for supplying an electric power from the outside is connected at the top of the electrolysis cell 503.

While the compression force on the polyelectrolyte membrane 506 is adjusted not to crush the polyelectrolyte membrane 506 by compressing it with the compression jig 523, the allowable range of adjustment is so narrow that the polyelectrolyte membrane may be crushed. Accordingly, an annular sheet of a seal member 524 is placed at the outside on the outer circumference of the polyelectrolyte membrane 506 so that the polyelectrolyte membrane 506 is not crushed even by applying excess compression force.

This seal member 524 is thinner and harder than the polyelectrolyte membrane 506, and is formed into a ring using a material such as a plastic being excellent in electrical insulation. While the relation between the thickness of the polyelectrolyte membrane 506 and the thickness of the seal member 524 should be appropriate for attaining seal characteristics, it can be confirmed by clamping the polyelectrolyte membrane 506 and seal member 524 with the double polarity electrodes 507, and by measuring electric resistance after compressing under a prescribed pressure.

When the seal characteristics have been determined to be inappropriate, the combination of the polyelectrolyte membrane 506 and seal member 524 is changed, or a seal material with a proper thickness is selected from the plural seal members 524 each having a different thickness, in order to select a combination with desirable electrical resistance.

It is preferable to provide an annular seal member around the permeation hole 508 constituting the pure water feed passageway B to improve sealing performance between the pure water feed passageway B and the electrode.

For preventing the polyelectrolyte membrane 506 and the sheet of the seal member 524 from being crushed by the weight of the double polarity electrode 507, it is desirable to restrict the number of the laminated double polarity electrodes 507, and to dispose a plurality of laminated electrodes as a cascade.

The main cathode 504 may be in electrical continuity with the high pressure hydrogen vessel 502 by allowing it to contact the mounting table 517, and the main anode 505 may be insulated from the high pressure hydrogen vessel 502. When the high pressure hydrogen vessel 502 is connected to the ground (not shown), the main cathode 504 is grounded while the main anode 505 is insulated from the ground potential. Consequently, an electric power is supplied to the electrolysis cell 503 by connecting a power source between a current introduction terminal 527 and the ground. Pure water is supplied from the pure water feed pipe line 547 through each pure water feed port 508a provided at the anode in contact with the pure water feed port B to the porous electrode 511, when electric power necessary for electrolysis of water is supplied to the main anode from the current introduction terminal 527 through the lead wire 532.

Oxygen generated by electrolysis of pure water, and pure water not electrolyzed are collected into the oxygen and pure water discharge passageway A having the plural permeation holes 509 through each discharge port 512, and returns to a high pressure vessel (not shown) for storing high pressure oxygen through the oxygen discharge pipe line 542.

Hydrogen generated at the cathode and permeated pure water are directly discharged into the high pressure vessel 502 from the discharge port 510, and permeated pure water is discharged from a pure water discharge pipe line 548 and is collected in a waste water tank (not shown). Hydrogen pooled in the high pressure vessel 502 is retrieved from a hydrogen feed port 538 formed in the high pressure vessel 502.

It is possible to reduce the differential pressure acting between both ends of the polyelectrolyte membrane 506, and the differential pressure acting at the seal member 524 between the double polarity electrodes 507 sealed with the polyelectrolyte membrane 506, to zero, by controlling the oxygen pressure of a high pressure vessel (not shown) for pooling oxygen to be equal to the hydrogen pressure in the high pressure vessel 502. Usually, the differential pressure between hydrogen and oxygen is controlled within the pressure resistance of the electrolysis cell 503, in order to protect the polyelectrolyte membrane 506 from being broken, and in order to prevent oxygen from leaking into the high pressure vessel 502 from the seal member 524, even when the hydrogen pressure pooled in the high pressure vessel 502 has exceeded the pressure resistance of the cell.

Figure 18:
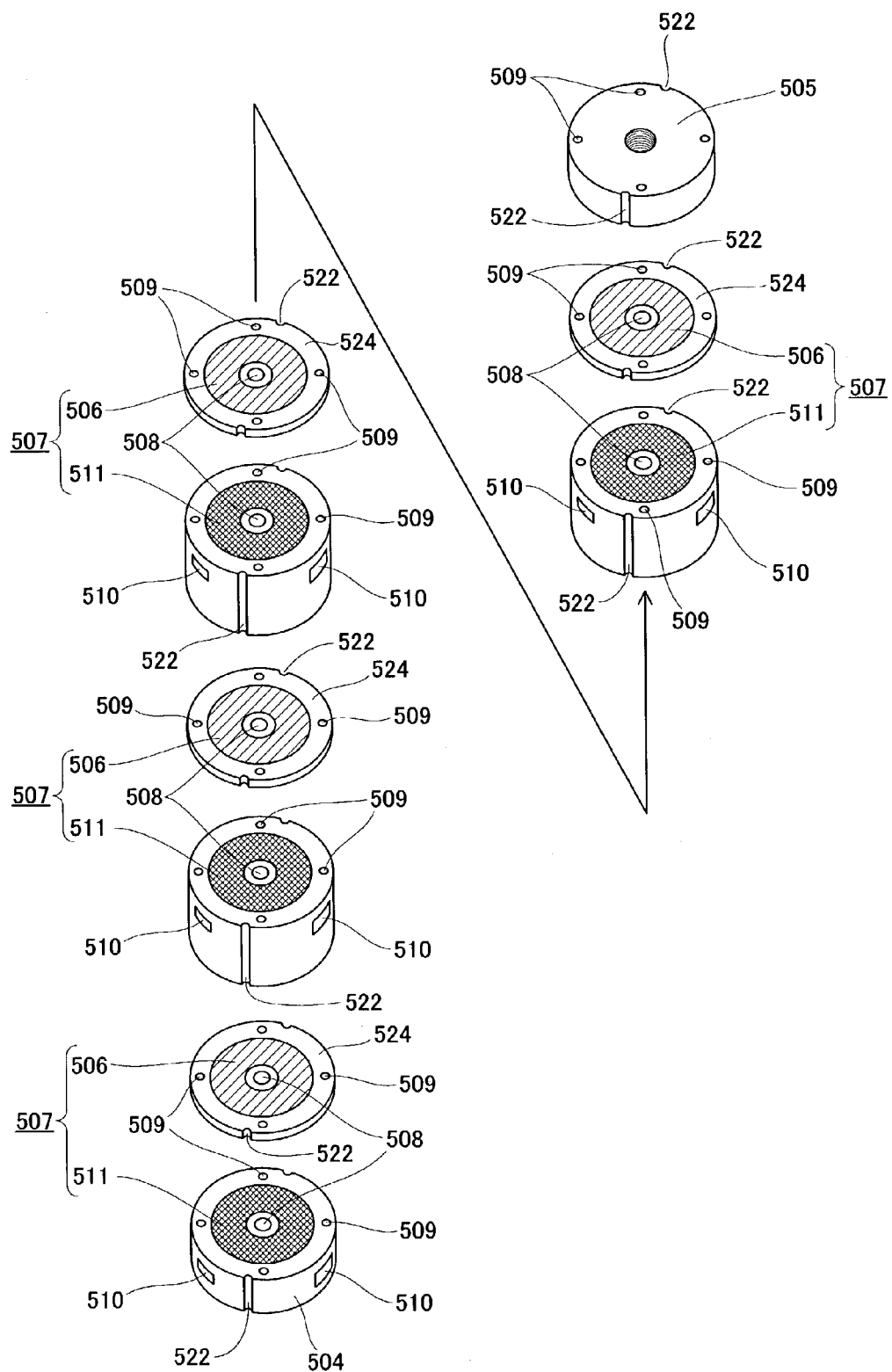
FIG. 18 shows disassembled perspective views of the electrolysis cell in FIG. 17.

FIG. 18 shows a disassembled perspective view of the electrolysis cell 503 shown in FIG. 17. The electrolysis cell 503 is composed of the annular polyelectrolyte membranes 506, the plural annular sheets of seal members 524 provided at the outer circumference of the polyelectrolyte membrane, and the plural annular double polarity electrodes 507 having the same diameter as each other. The polyelectrolyte membranes, seal members and double polarity electrodes are laminated in the vertical direction between the main cathode 504 and main anode 505. A discharge port 512 for discharging oxygen generated and pure water not electrolyzed out of the high pressure vessel 502 is provided at the anode side of each member, and a discharge hole 510 for directly discharging hydrogen generated and permeated pure water into the high pressure vessel 502 is provided at the cathode side of each member.

A permeation hole 508 for forming the pure water feed passageway B for feeding electrolysis pure water is provided at the center of each member except the main anode 505, and a pure water feed port 508a for feeding pure water to the anode is formed within each double polarity electrode 507. A seal member 505a for sealing the terminal of the pure water feed passageway B, a hole and a pure water feed port 508a connected to the hole, and an oxygen and pure water discharge port 512 are provided at the main anode 505.

A discharge port 510 is provided at the side wall of each double polarity electrode 507 in order to discharge hydrogen generated at the cathode and permeated pure water into the high pressure vessel 502.

Accordingly, as is evident from FIG. 18, pure water supplied from the pure water feed passageway B formed at the center of the main cathode 504 is delivered to each porous electrode 511 at the anode side from the pure water feed port 508a. Oxygen generated at the anode and pure water not electrolyzed flows into the oxygen discharge passageway A from the oxygen and pure water discharge port 512, and is retrieved to the outside of the high pressure vessel 502 through the oxygen discharge pipe line 542.

Hydrogen generated at the cathode and permeated pure water is directly discharged into the high pressure vessel 502 from the hydrogen and pure water discharge port 510.

The porous electrode 511 comprises a titanium mesh, and both end faces thereof are fixed to the inner wall of the double polarity electrode 507 by welding. The surfaces of the mesh for contacting the polyelectrolyte membrane 506 having platinum catalyst formed on both surfaces are finished as a smooth surface by polishing, and comprises a carbon coating film deposited by ECR plasma deposition on the surface thereof.

Each member constituting the electrolysis cell 503 in FIG. 18 has positioning grooves 522 at the outer circumference in the axial direction in order to facilitate assembling of the members.

Figure 19:
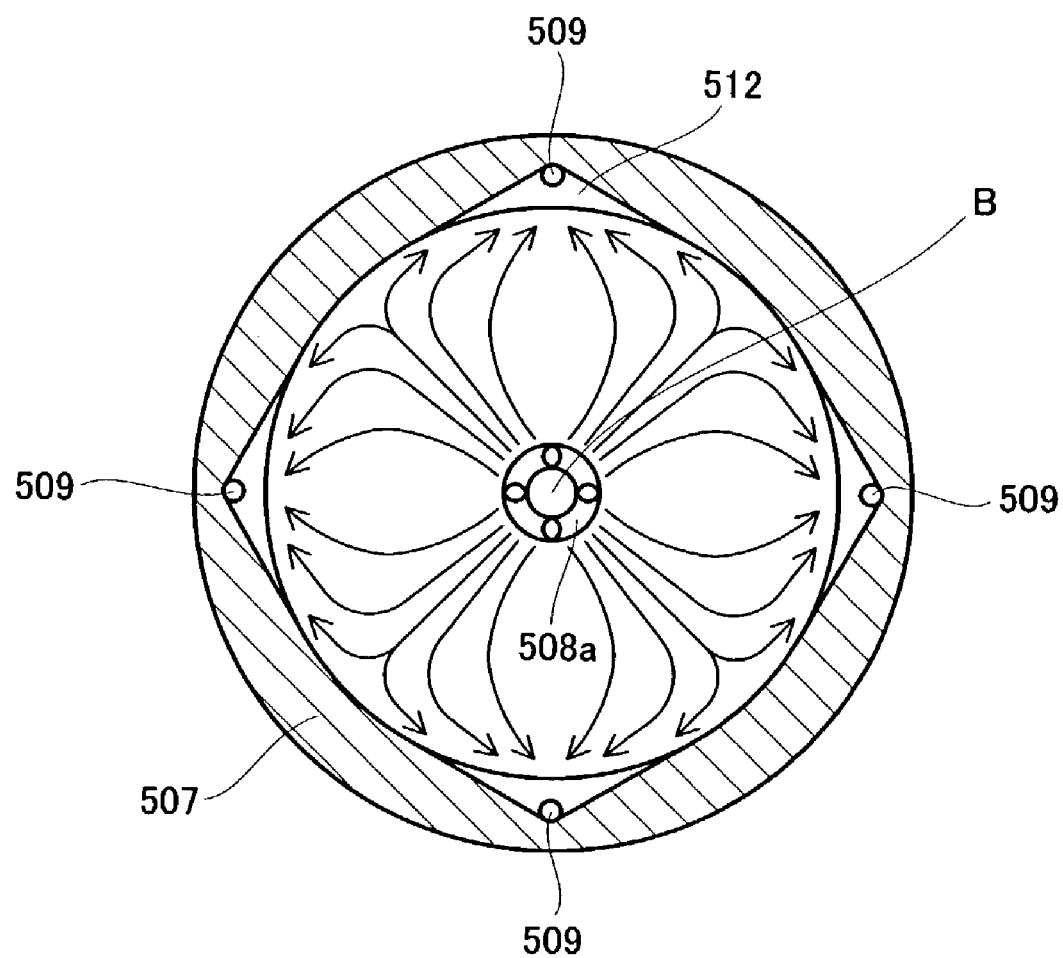
FIG. 19 illustrates a flow pattern of pure water on the anode of the electrolysis cell shown in FIG. 17.

FIG. 19 illustrates a flow pattern of pure water supplied to the anode of the electrolysis cell. The arrows in the drawing show pure water streams. Pure water is supplied from the pure water feed passageway B provided at the center to the pure water feed port 508a, and flows toward the inner circumference wall of the double polarity electrode 507 by being spread through an angle of 360°. The streams are tapered, and pure water flows into the oxygen discharge passageway A comprising the permeation holes 509 through the oxygen and pure water discharge ports 512 that are symmetrically arranged.

What is claimed is:

1. A system for generating high pressure hydrogen by direct electrolysis of pure water using an electrolysis cell comprising polyelectrolyte membranes, wherein an electrolysis cell disposed in hydrogen gas generated and stored in a high pressure vessel that serves as a storage tank of hydrogen generated and electrolysis pure water stored in another high pressure vessel that communicates with the electrolysis cell and serves as a storage tank of oxygen generated, wherein the system has pressure control means for controlling a differential pressure between the inner pressure of the high pressure vessel for storing hydrogen and the inner pressure of the high pressure vessel for storing oxygen to a pressure below the pressure resistance of the electrolysis cell, wherein the pressure control means is provided for adjusting the differential pressure to a pressure below the pressure resistance of the electrolysis cell by allowing pure water to be transferred by switching the valves in the vessels connected to pipe lines communicating with the pure water in the respective high pressure vessels, and wherein the pressure control means has a differential pressure gauge which is comprising:

a cylinder of a non-magnetic material having both ends sealed with elastic bellows disposed in the axial direction by the pressures of respective high pressure vessels and filled with an inert fluid;

a main unit comprising an internal magnetic body provided in close contact with the inner surface of the cylinder and an external magnetic body provided in close contact with the outer surface of the cylinder; and a sensor for sensing the differential pressure based on the position of the external magnetic body that changes by elastic deformation of the bellows.

2. The system for generating high pressure hydrogen according to claim 1, wherein the pipe lines communicating with the pure water in the high pressure vessels comprise two pipes of a pipe line having a valve provided in the high pressure vessel for storing hydrogen and a pipe line having a valve provided in the high pressure vessel for storing oxygen.

3. The system for generating high pressure hydrogen according to claim 2, wherein the valves have a triangular discharge port.

4. The system for generating high pressure hydrogen according to claim 1, wherein the sensor comprises a light shielding plate interlocked with the external magnetic body, an aperture plate having an opening shielded with the light shielding plate, and a photoelectric meter for converting luminous energy permeating through the opening into electric signals.

5. The system for generating high pressure hydrogen according to claim 1, wherein the sensor comprises a slider sliding on an electric resistor by being interlocked with the external magnetic body.

6. System for generating high pressure hydrogen by direct electrolysis of pure water using an electrolysis cell comprising polyelectrolyte membranes,
   wherein an electrolysis cell disposed in hydrogen gas generated and stored in a high pressure vessel that serves as a storage tank of hydrogen generated and electrolysis pure water stored in another high pressure vessel that communicates with the electrolysis cell and serves as a storage tank of oxygen generated,
   wherein the system has pressure control means for controlling a differential pressure between the inner pressure of the high pressure vessel for storing hydrogen and the inner pressure of the high pressure vessel for storing oxygen to a pressure below the pressure resistance of the electrolysis cell,
   wherein the pressure control means is provided in the pipe line communicating with pure water in respective high pressure vessels and adjusts the pressure of the vessels with a pressure controller containing a slider sliding in response to the differential pressure of pure water in respective high pressure vessels, and
   wherein the pressure controller has a main unit and a position sensor for sensing the position of an external slider, and adjusts the pressure of high pressure vessels by allowing pure water in the respective high pressure vessels to move, and the main unit comprising:
   a hollow cylinder made of a non-magnetic material with one end communicating with the pure water in the high pressure vessel for storing hydrogen and the other end communicating with the pure water in the high pressure vessel for storing oxygen;
   an internal slider made of a magnetic material for blocking the pure water and sliding in close contact with an inner surface of the hollow cylinder; and
   an external slider made of a magnetic material and sliding in close contact with the outer surface of the hollow cylinder.

7. The system for generating high pressure hydrogen according to claim 6, wherein the hollow cylinder has buffer means as well as flow passageways at both ends thereof, which provide for flowing pure water through the passageways when the internal slider slides to one of both ends of the cylinder.

8. The system for generating high pressure hydrogen according to claim 6, wherein the hollow cylinder has buffer means as well as switches at both ends thereof, which provide for switching a shutoff valve provided in the pipe line for flowing pure water when internal slider slides to one of both ends of the cylinder.

9. The system for generating high pressure hydrogen according to claim 6, wherein the hollow cylinder has a net volume equal to or smaller than the smaller one of either the volume of hydrogen stored in the high pressure vessel for storing hydrogen or the volume of oxygen stored in the high pressure vessel for storing oxygen.

10. The system for generating high pressure hydrogen according to claim 1 or 6,
    wherein the pressure control means is provided for adjusting the inner pressure of the high pressure vessel for storing hydrogen to be a little lower than the inner pressure of the high pressure vessel for storing oxygen.

11. The system for generating high pressure hydrogen according to claim 1 or 6,
    wherein the pressure control means is provided for measuring the pressures of respective high pressure vessels and adjusting the differential pressure to a pressure below the pressure resistance of the electrolysis cell by discharging hydrogen or oxygen through valves provided at respective high pressure vessels being switched based on the measured values.

12. The system for generating high pressure hydrogen according to claim 1 or 6, wherein the system has a heat exchanger provided outside the high pressure vessel for cooling the generated hydrogen.

13. The system for generating high pressure hydrogen according to claim 12, wherein the high pressure vessel for storing hydrogen and the heat exchanger provided at the outside of the high pressure vessel are connected with a hydrogen cooling pipe line comprising a plurality of branched fine tubes branched in the high pressure vessel.

14. The system for generating high pressure hydrogen according to claim 13, wherein each of the fine tubes are held and plumbed at a center of a core and hermetically fixed in through-holes tapered from the inside toward the outside of side walls constituting the respective high pressure vessels.

15. The system for generating high pressure hydrogen according to claim 1 or 6, wherein the system has heat exchangers in the passageway of the pipe line for feeding the pure water for electrolysis to the electrolysis cell and/or in the passageway of the pipe line for returning the pure water from the electrolysis cell, and the heat exchangers are provided for controlling the temperatures of the pure water supplied to the electrolysis cell and/or the pure water returned from the electrolysis cell, or preventing the pure water from freezing.

16. The system for generating high pressure hydrogen according to claim 15, wherein the pipe line for the returned pure water comprises a plurality of branched fine tubes in the high pressure vessel for storing hydrogen.

17. The system for generating high pressure hydrogen according to claim 1 or 6, wherein the system has a plurality of cooling fine tubes, disposed within the high pressure vessel for storing hydrogen and/or high pressure vessel for storing oxygen, for controlling the temperatures of stored hydrogen and/or oxygen and pure water, or for preventing pure water from freezing.

18. The system for generating high pressure hydrogen according to claim 1 or 6, wherein the high pressure vessel for storing oxygen houses a water feed pump for feeding pure electrolysis water stored in the vessel to the electrolysis cell, and a motor for driving the water feed pump.

19. The system for generating high pressure hydrogen according to claim 1 or 6, wherein the high pressure vessel for storing oxygen is furnished with volume control means for controlling the volume of pure water stored in the high pressure vessel to be larger than the volume of the high pressure vessel for storing hydrogen, and for controlling the volume of oxygen to be 4% or less of the volume of the high pressure vessel for storing hydrogen.

20. The system for generating high pressure hydrogen according to claim 19,
wherein the volume control means comprises at least a level meter for measuring the surface of pure water filled in the high pressure vessel for storing oxygen, and a needle valve interlocking with the level meter, and
the level meter is provided for controlling the surface of the pure water so that the volume of oxygen collected in the high pressure vessel for storing oxygen becomes 4% or less of the volume of the high pressure vessel for storing hydrogen.

21. The system for generating high pressure hydrogen according to claim 20, wherein the level meter comprises metal electrodes electrically insulated from each other and fixed to a brace, and a resistance meter for measuring the electrical resistance between the electrodes and the high pressure vessel.

22. The system for generating high pressure hydrogen according to claim 20, wherein the level meter comprises a cylindrical electrode having a rod-shaped electrode at the center.

23. The system for generating high pressure hydrogen according to claim 22, wherein the level meter also comprises a rod-shaped reference electrode covered with an electrically insulated cylinder except the tip thereof, and a cylindrical reference electrode having the rod-shaped reference electrode at the center thereof.

24. The system for generating high pressure hydrogen according to claim 1 or 6, wherein the high pressure vessel for storing oxygen is furnished with a pure water replenishing equipment composed of a circulation system comprising a pure water storage tank for replenishing consumed pure water, an ion-exchanger tower and a pure water replenishing tank.

25. The system for generating high pressure hydrogen according to claim 24,
wherein the pure water replenishing equipment comprises the pure water replenishing tank, a feed pipe line and a pipe line for returning oxygen and pure water,
the pure water replenishing tank being disposed so that pure water stored therein is able to be supplied gravitationally to the high pressure vessel for storing oxygen and so as to be able to accept oxygen in the high pressure vessel for storing oxygen,
the feed pipe line being disposed between the pure water storage tank and pure water replenishing tank so that pure water in the pure water storage tank is supplied to the pure water replenishing tank through the ion-exchanger tower, and
the pipe line for returning oxygen and pure water being disposed between the pure water storage tank and pure water replenishing tank so that high pressure oxygen in the pure water storage tank is able to be discharged through a filter provided in the pure water replenishing tank, pure water in the pure water replenishing tank being circulated until pure water resumes a prescribed resistivity.

26. The system for generating high pressure hydrogen according to claim 1 or 6,
wherein the electrolysis cell is a double-polarity multi-layered electrolysis cell manufactured by laminating a plurality of double-polarity electrodes comprising polyelectrolyte membranes having catalytic layers formed on both surfaces thereof and porous electrodes in contact with both surfaces of the polyelectrolyte membrane,
the double-polarity electrolysis cell being disposed on a mounting table in the high pressure vessel so as to be compressed with compression jigs from above the table.

27. The system for generating high pressure hydrogen according to claim 26, wherein the electrolysis cell is a double-polarity multi-layered electrolysis cell having double-polarity electrodes comprising a pure water feed passageway formed at the center of the double polarity electrode.

28. The system for generating high pressure hydrogen according to claim 26,
wherein the electrolysis cell is a double-polarity multi-layered electrolysis cell comprising a pure water feed passageway formed at the center of the double polarity electrode with a discharge port of oxygen and pure water at the anode side of each double-polarity electrode and a discharge port for directly discharging hydrogen and pure water into the high pressure vessel formed at the cathode side, and
oxygen and pure water discharge passageways being vertically formed at the outer circumference of each double-polarity electrode so as to contact the oxygen and pure water discharge port.

29. The system for generating high pressure hydrogen according to claim 26, wherein the shape of the double-polarity electrodes is a disk.

30. The system for generating high pressure hydrogen according to claim 26, wherein the polyelectrolyte membrane is fixed to the double-polarity electrode with a sheet of seal member interposed at the outer circumference of the polyelectrolyte membrane.

31. The system for generating high pressure hydrogen according to claim 30, wherein the sheet of seal member is formed of a material thinner and harder than the polyelectrolyte membrane.

32. The system for generating high pressure hydrogen according to claim 26, wherein the compressed double-polarity multi-layered electrolysis cells are disposed to form a cascade.

33. The system for generating high pressure hydrogen according to claim 26, wherein the table for mounting the electrolysis cell comprises a pure water feed port for feeding pure water to the pure water feed passageway.

34. The system for generating high pressure hydrogen according to claim 26, wherein one end of the compression jig is fixed and held on an inner wall of the high pressure vessel.

35. The system for generating high pressure hydrogen according to claim 26, wherein the compression jig comprises a main unit of the jig fixed at an upper part of the electrolysis cell, a spring accommodated within the main unit of the jig, and a press screw with one end held in the high pressure vessel in order to energize the spring.

36. The system for generating high pressure hydrogen according to claim 26, wherein the double-polarity electrodes are laminated in a vertical direction with the top face serving as an anode and the bottom face serving as a cathode.

37. The system for generating high pressure hydrogen according to claim 26, wherein the porous electrode is fixed within the electrolysis cell by welding.

38. The system for generating high pressure hydrogen according to claim 26, wherein the electrolysis cell comprises the porous electrode having a polished surface in contact with the polyelectrolyte membrane.

* * * * *

UNITED STATES PATENT AND TRADEMARK OFFICE
CERTIFICATE OF CORRECTION

| | | |
|---|---|---|
| PATENT NO. | : 7,048,839 B2 | Page 1 of 1 |
| APPLICATION NO. | : 10/352968 | |
| DATED | : May 23, 2006 | |
| INVENTOR(S) | : Hiroyuki Harada | |

It is certified that error appears in the above-identified patent and that said Letters Patent is hereby corrected as shown below:

TITLE PAGE,
    Item "(30) Foreign Application Priority Data", change application number "2002-077314" to -- 2002-077344 --.

Signed and Sealed this

Thirty-first Day of July, 2007

JON W. DUDAS
*Director of the United States Patent and Trademark Office*